(12) United States Patent
Kerzner et al.

(10) Patent No.: US 10,756,919 B1
(45) Date of Patent: Aug. 25, 2020

(54) CONNECTED AUTOMATION CONTROLS USING ROBOTIC DEVICES

(71) Applicant: Alarm.com Incorporated, Tysons, VA (US)

(72) Inventors: Daniel Todd Kerzner, McLean, VA (US); Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 326 days.

(21) Appl. No.: 15/824,695

(22) Filed: Nov. 28, 2017

Related U.S. Application Data

(60) Provisional application No. 62/426,928, filed on Nov. 28, 2016.

(51) Int. Cl.
*H04L 12/28* (2006.01)
*B64C 39/02* (2006.01)
*G05D 1/00* (2006.01)
*B25J 11/00* (2006.01)

(52) U.S. Cl.
CPC ......... *H04L 12/2816* (2013.01); *B25J 11/008* (2013.01); *B64C 39/024* (2013.01); *G05D 1/0088* (2013.01); *H04L 12/2812* (2013.01); *H04L 12/2825* (2013.01); *H04L 12/2827* (2013.01); *B64C 2201/126* (2013.01)

(58) Field of Classification Search
CPC combination set(s) only.
See application file for complete search history.

(56) References Cited

U.S. PATENT DOCUMENTS

| 9,981,744 | B2 | 5/2018 | Choo et al. | |
| 2015/0370272 | A1* | 12/2015 | Reddy | G05B 17/02 |
| | | | | 700/278 |
| 2016/0068264 | A1 | 3/2016 | Ganesh et al. | |
| 2016/0107749 | A1* | 4/2016 | Mucci | B64C 39/024 |
| | | | | 701/3 |
| 2016/0266579 | A1 | 9/2016 | Chen et al. | |
| 2016/0307449 | A1 | 10/2016 | Gordon et al. | |
| 2016/0320889 | A1* | 11/2016 | Jenkinson | G06F 11/2221 |
| 2017/0227965 | A1 | 8/2017 | Decenzo et al. | |
| 2017/0359554 | A1 | 12/2017 | Madhav et al. | |
| 2018/0118337 | A1 | 5/2018 | Viel | |

* cited by examiner

*Primary Examiner* — Abby Y Lin
*Assistant Examiner* — Renee LaRose
(74) *Attorney, Agent, or Firm* — Fish & Richardson P.C.

(57) ABSTRACT

Methods, systems, and apparatus, including computer programs encoded on a storage device, for using a robotic device to manipulate a manual control of a device. In one aspect, the system includes a robotic device, a first device that is located at a property and that has a manual control, and a monitoring unit. The monitoring unit may include a network interface, a processor, and a storage device that includes instructions to cause the processor to perform operations. The operations may include determining an operating state of the first device, determining the state of the monitoring system, determining whether one or more of the manual controls associated with the first device should be manipulated to alter the operating state of the first device, and transmitting one or more instruction to the robotic device that instruct the robotic device to manipulate one or more manual controls that are associated the first device.

18 Claims, 11 Drawing Sheets

CONNECTED AUTOMATION CONTROLS USING ROBOTIC DEVICES

CROSS-REFERENCE TO RELATED APPLICATION

This application claims the benefit of the U.S. Provisional Patent Application No. 62/426,928 filed Nov. 28, 2016 and entitled "Connected Automation Controls Using Robotic Devices," which is incorporated herein by reference in its entirety.

BACKGROUND

Connected-homes are becoming more common. Connected-devices such as lightening units, thermostats, garage doors, locks, and the like can be controlled from a security panel, a user's mobile device, or both. For example, when the aforementioned connected-devices are properly installed a property, a user can use his mobile device to turn lights on (or off), adjust a thermostat, open (or close) a garage door, lock (or unlock) a door, or the like. However, outfitting an entire property such as a residential dwelling unit, a commercial office building, or an industrial complex, with the necessary hardware and software to facilitate the aforementioned may be prohibitively expensive and/or require technical knowledge a property owner, property manager, or property occupant may not possess.

In some instances, a property that already has one or more connect-devices installed may have a need for alternative connected-home solutions. This is because, even adequately installed connected devices may subject to failure for a variety of reasons such as drained batteries, lack of network connected (e.g., Wi-Fi network is down), or the like. In such instances, alternative connected-home solutions may be desired so that a property owner, property manager, or property occupant can still realize connected-home functionality when one or more connected home devices are offline.

SUMMARY

Techniques are described for robotic assistance with manipulating manual controls located throughout a property. In some implementations, this may include a robotic device operating inside and/or outside a property to assist with manipulation of manual controls. The robotic device may deploy to manipulate a manual control in response to sensor data received from one or more sensors, in response to a message received from a user device, or in response to the detection of a connected device failure. The robotic device may include a drone device that is capable of navigating a property via flight, land travel, or a combination thereof.

According to one innovative aspect of the present disclosure, a monitoring system is disclosed that uses a robotic device to manipulate manual controls is disclosed. The monitoring system may include a robotic device, a first device that is located at a property and that has an operating state controlled by manipulation of a manual control, and a monitoring unit. The monitoring unit may include a network interface, one or more processors, and one or more storage devices that include instructions that are operable, when executed by the one or more processors, to cause the one or more processors to perform operations. The operations may include determining an operating state of the first device, determining a state of the monitoring system, determining, based on (i) the operating state of the first device and (ii) the state of the monitoring system, whether to alter the operating state of the first device by manipulating the manual control, and in response to determining, based on the operating state of the first device and the state of the monitoring system, to alter the operating state of the first device by manipulating the manual control, transmitting one or more instructions to the robotic device that instruct the robotic device to (i) navigate to the first device and (ii) manipulate the manual control.

Other aspects include corresponding methods, apparatus, and computer programs to perform actions of methods defined by instructions encoded on computer storage devices.

These and other versions may optionally include one or more of the following features. For instance, in some implementations, wherein determining the state of the monitoring system may include determining a number of moving objects at the property, and determining whether the number of moving objects at the property satisfies a predetermined threshold.

In some implementations, the operations may further include determining whether to alter the operating state of the first device based on the determination that the number of moving objects at the property satisfies a predetermined threshold, and in response to determining that the operating state of the first device should be altered based on the determination that the number of moving objects at the property satisfies a predetermined threshold, transmitting one or more instructions to the robotic device that instruct the robotic device to (i) navigate to the first device and (ii) manipulate the manual control.

In some implementations, determining the state of the monitoring system may include determining that movement has not been detected at the property for more than a threshold period of time.

In some implementations, the operations may further include determining whether to alter the operating state of the first device based on the determination that movement of one or more objects has not been detected at the property for more than a threshold period of time, and in response to determining that the operating state of the first device should be altered based on the determination that movement of one or more objects has not been detected at the property for more than a threshold period of time, transmitting one or more instructions to the robotic device that instruct the robotic device to (i) navigate to the first device and (ii) manipulate the manual control.

In some implementations, system may further include a plurality of sensors installed at the property, and in such implementations, determining an operating state of the first device may include obtaining sensor data from one or more of the plurality of sensors, and determining the state of the first device based on the sensor data.

In some implementations, the sensor data from the one or more of the plurality of sensors may include data indicating whether light is detected in a portion of the property.

In some implementations, the first device may include a lighting unit and the manual control may include a light switch, and the operating state may include the lighting unit being powered on and an altered operating state may include the lighting unit being powered off.

In some implementations, the sensor data from one or more of the plurality of sensors may include data indicating whether the first device is opened or closed.

In some implementations, the first device may include a garage door and the manual control may include a garage door opener, and the operating state may include the garage door being opened and an altered operating state may include the garage door being closed.

In some implementations, determining the state of the monitoring system may include determining that a temperature a portion of the property has exceeded a predetermined temperature range.

In some implementations, the sensor data from the one or more of the plurality of sensors may include data indicating a first temperature setting of a thermostat.

In some implementations, the first device may include a thermostat and the one or more manual controls may include a rotatable dial, one or more physical buttons, one or more graphical buttons on a graphical user interface, or a combination thereof, and the operating state may include the thermostat being set to the first temperature setting and an altered operating state may include the thermostat being set to a second temperature setting.

In some implementations, the sensor data from the one or more of the plurality of sensors may include data indicating whether the first device is using electricity or gas.

In some implementations, the first device may include an oven and the manual control may include a dial that controls the supply of gas or electricity to one or more portions of the oven, the operating state may include a heating element that is on and generating heat and an altered operating state includes a heating elements that is off and no longer generating heat.

In some implementations, the operations may further include obtaining a location of the first device, and transmitting the instruction to the robotic device includes transmitting the location of the first device to the robotic device.

In some implementations, the robotic device may include a flying quadcopter drone.

In some implementations, the monitoring unit may include a server that resides in a location that is remote from the property.

The monitoring system described by the present disclosure provides multiple advantages over existing systems. For example, the disclosed monitoring system enables a property owner or occupant to achieve a connected property in a cost-effective manner by purchasing a drone instead of purchasing connected devices throughout the property such as a connected lightbulb for every light in the property, a connected garage door, a connected lock for each lock of the property, a connected thermostat, a connected oven, and the like. In addition, set up and installation of a connected home with automation controls using the disclosed monitoring system is more efficient because the drone can autonomously navigate the property to identify manual controls instead of a person installing a connected device at each light bulb (or light switch), each a garage door (or garage door opener), each thermostat, each lock, each oven, etc.

The monitoring system described by the present disclosure also provides advantages for those that already have installed one or more connected home devices with automation controls. This is because, for example, the monitoring system described by the present disclosure can be used to provide automation of manual controls in the event of a failure of a connected device installed at the property.

DETAILED DESCRIPTION

Figure 1:
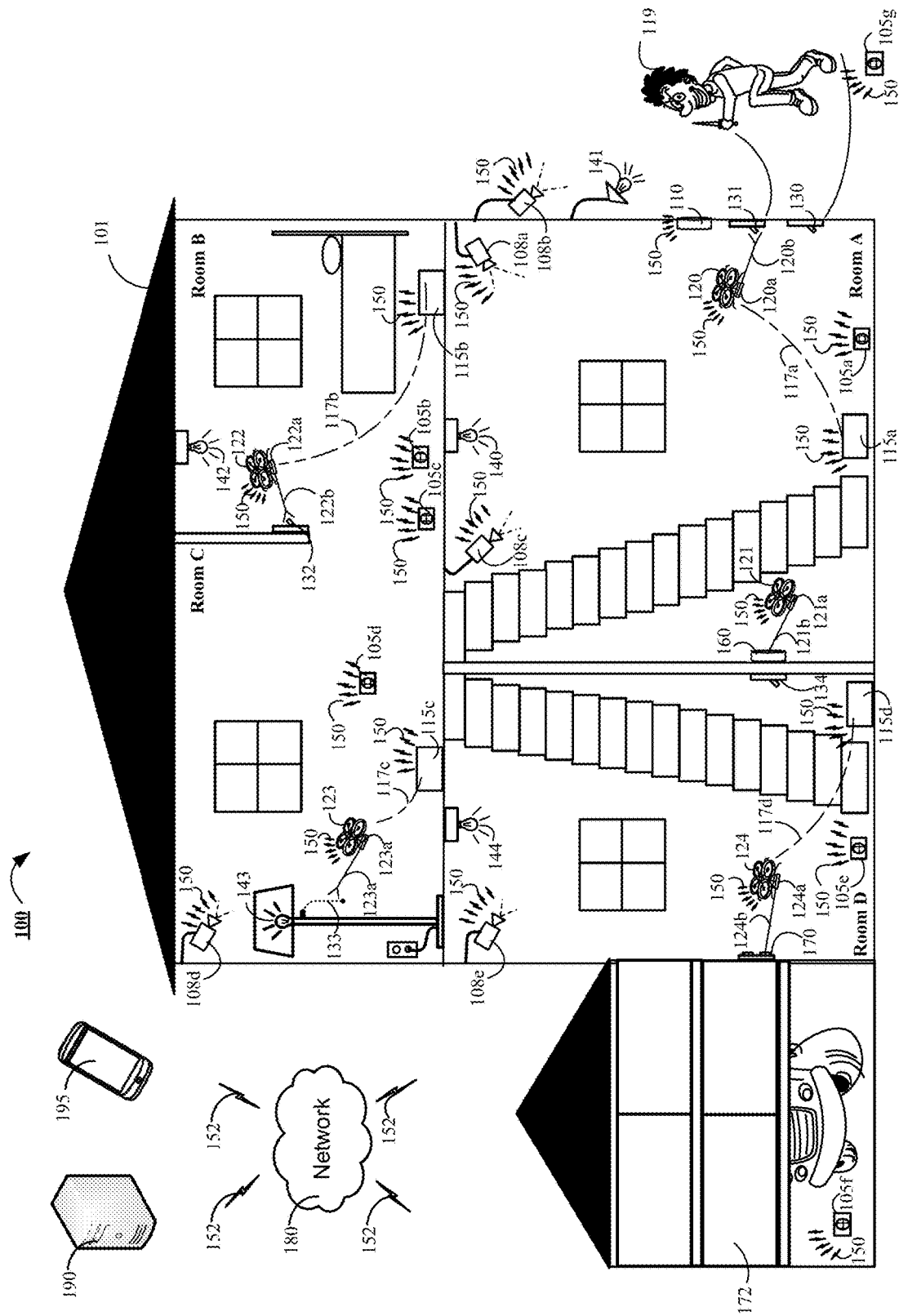
FIG. 1 is a contextual diagram of an example of a system that uses one or more drones to manipulate manual controls.

FIG. 1 is a contextual diagram of an example of a system 100 that uses one or more drones 120, 121, 122, 123, 124 to manipulate manual controls.

The system 100 includes one or more sensors 105a, 105b, 105c, 105d, 105e, 105f, 105g, a monitoring system control unit 110, one or more wireless charging stations 115a, 115b, 115c, 115d, and one or more drones 120, 121, 122, 123, 124. In some implementations, the system 100 may also include one or more cameras 108a, 108b, 108c, 108d, 108e. In some implementations, the system 100 may also include a monitoring application server 190, a user device 195, or both. In such instances, the monitoring system control unit 110, one or more drones 120, 121, 122, 123, 124, or a combination thereof may be able to receive instructions from or send communications to the monitoring application server 190, the user device 195, or both, using the network 180 and one or more communications links 152. The network 180 may include one or more networks such as a LAN, a WAN, a cellular network, the Internet, or the like.

The system 100 may facilitate networked communication between each component of system 100 such as one or more sensors 105a, 105b, 105c, 105d, 105e, 105f, 105g one or more cameras 108a, 108b, 108c, 108d, 108e, a monitoring system control unit 110, one or more wireless charging stations 115a, 115b, 115c, 115d, one or more drones 120, 121, 122, 123, 124 via a network 150. The network 150 may include, for example, any type of wired network, wireless network, or a combination thereof, that facilitates communication between the components of system 100 including a LAN, a WAN, Z-wave network, a ZigBee network, a cellular network, the Internet, or a combination thereof. One or more devices connected to network 150 may also be able to communicate with one or more remote devices such as the monitoring application server 190 or the user device 195 via the network 180 using one or more communication links 152. Though the user device 195 is depicted as a remote device that can communicate with one or more components of system 100 connected to network 150 via network 180, the present disclosure need not be so limited. For instance, there may be instances where the user device 195 is located within range of, and connected to, the network 150. In such instances, the user device 195 may communicate with one or more components of system 100 connected to network 150 using network 150.

The example of FIG. 1 depicts five different drones 120, 121, 122, 123, 124 in an effort to highlight different features of the present disclosure. However, the present disclosure need not require an implementation that utilizes multiple drones. For instance, each of the examples described with reference to FIG. 1 as being performed by different drones 120, 121, 122, 123, 124 are examples of actions that a single drone can perform in a single drone system upon the detection of the occurrence of a scenario described by one or more predetermined conditions by the monitoring system control unit 110.

A predetermined condition may include, for example, stored data that describes an operating state of a device and a state of the monitoring system. An operating state of a device may include whether the device is powered on, powered off, open, closed, using gas or electric to generate heat, not using gas or electric to generate heat, a particular temperature setting, or the like. A state of the monitoring system may include, for example, a time of day, a number of moving objects detected at the property, a number of potential alarm events detected at the property, the amount of time the system 100 has been responding to one or more alarm events, whether the system was "armed away," "armed stay," or the like. Armed away may include an arming state of the monitoring system 100 where motion sensors are armed. Armed stay may include an arming state of the monitoring system 100 where the motion sensors are not armed. Even when not armed, motion sensors may detect data indicating of a moving object that can be used by the monitoring system control unit 110, monitoring application server 190, or both to determine a state of the monitoring system 100. A sensor may be considered to be "armed" if the monitoring system control unit With reference to the example of Room A, a burglar 119 may approach the property 101 after dark in the middle of the night. The monitoring system control unit 110 may receive (e.g., detect) sensor data from a motion sensor such sensor 105g via the network 150 in response to the sensor 105g detecting the movement of a potential burglar 119 on the property's 101 sidewalk. The monitoring system control unit 110 may process the received sensor data, and determine based on the state of the system 100 that sensor data is indicative of a potential alarm event. Evaluating the state of the system 100 may include, for example, evaluating the time of day, number of moving objects, number of potential alarm events detected, the amount of times the system 100 is responding to alarm events, evaluating whether the monitoring system 100 is armed "away," evaluating whether the system is armed "stay," or a combination thereof. In this example, the monitoring system control unit 110 may determine that a potential alarm event exists because it is nighttime and movement is detected on the property's 101 sidewalk.

The monitoring system control unit 110 may also determine that there is an outside light 141 in the vicinity of sensor 105g having a current operating state of being powered off. Based on the determination by the monitoring system control unit 110 that the monitoring system 100 is in the state of detecting an alarm event and two that a light 141 in the vicinity of the detected event is powered off, the monitoring system control unit 110 may determine that a manual control associated with the light 141 should be manipulated.

For example, in an effort to startle the burglar 119, the monitoring system control unit 110 can send an instruction to the drone 120 via the network 150 that instructs the drone 120 to turn on the light 141. In response to the instruction, the drone 120 may access a map of the property 101, and navigate on a flight path 117a to a manual control associated with the light 141 such as light switch 131. The drone 120 may use a mechanical arm deployment unit 120a to deploy a mechanical arm 120b that is configured to engage the light switch 131. The drone 120 can then use the mechanical arm 120b to manipulate the light switch 131 from a first operating state (e.g., powered off) to a second operating state (e.g., powered on), which results in turning the light 141 on. The drone 121 may manipulate the light switch 131 by, for example, using the mechanical arm 121b to flip the light switch up. The light 141 can then turn on, and potentially frighten the burglar 119 away, as the burglar may think that a legitimate resident of property 101 is home, and turned on the light.

In the example described with reference to Room A, the monitoring system control unit 110 received (e.g., detected) sensor data from a sensor 105g, and evaluated the sensor data to determine whether a potential alarm event existed. However, the present disclosure need not be so limited. Instead, in some implementations, the monitoring system control unit 110 may, alternatively, or in addition, generate an alarm event notification based on the received sensor data, and then transmit the alarm event notification to the monitoring application server 190 using the networks 150, 180, and one or more communications links 152. Then, the monitoring application server 190 may evaluate the alarm event notification, determine whether a potential alarm event exists, and transmit one or more instructions to one or more components of system 100 indicating how the components of system 100 should respond to the potential alarm event. For example, in some implementations, the monitoring application server 190 may transmit a notification to a central alarm station server via the network 180 indicating that a potential alarm event is occurring at the property 101. In such instance, the central alarm station server may communicate within one or more occupants of the property via a communication unit in the monitoring system control unit 110, communicate within one or more occupants, owners, or renters of a combination thereof. Alternatively, in other implementations, the monitoring system control unit 110 may directly communicate with the central alarm station server without relying on the monitoring application server 190 as an intermediary. Accordingly, the monitoring system control unit 110 may perform processing of received sensor data to determine the existence of a potential alarm event and notify a central alarm station, the monitoring system control unit 110 may relay the sensor data to a monitoring application server 190 for evaluation to determine whether the central alarm station should be notified, or a combination of both.

With further reference to Room A, the monitoring system control unit 110 may determine, based on the state of the monitoring system 100, that the temperature in the property 101 does not satisfy a predetermined temperature range. For example, the monitoring system control unit 110 may determine that it is too hot in the property 101. The monitoring system control unit 110 may also determine the current operating state of the thermostat 160. The current operating state of the thermostat 160 may include, for example, the temperature setting of the thermostat 160. The monitoring system control unit 110 may instruct a drone 121 to navigate to a thermostat 160 to adjust the temperature setting of the thermostat 160 to a second operating state. The second operating state may include a temperature setting that is lower than the temperature setting associated with the current operating state.

In response to the instruction, the drone 121 may access a map of the property 101, and navigate on a flight path to a manual control associated with the thermostat 160. The drone 121 may use a mechanical arm deployment unit 121a to deploy a mechanical arm 121b that is configured to engage the interface of the thermostat 160. In some implementations, the appendages of the mechanical arm 121b may include artificial skin that simulates human touch to enable the mechanical arm 121b to interact with a graphical thermostat interface including, for example, a capacitive touch screen interface. The drone 121 can then use the mechanical arm 121b to manipulate thermostat settings via the interface of the thermostat 160 from the current operating state (e.g., a first temperature setting) to a second operating state (e.g., a second temperature setting). In this example, the drone 212 may use the mechanical arm 121b to manipulate one or more manual controls of the thermostat 160 in a manner that reduces the temperature setting of the thermostat 160. Using the mechanical arm 121b to manipulate the interface of the thermostat 160 may include, for example, tapping one or more graphical icons on a graphical user interface of the thermostat. As a result, the property's 101 HVAC unit can begin to cool the property 101.

With reference to Room B, the Room B may include multiple sensors. The multiple sensors may include at least one motion sensor 105b and at least one light sensor 105c. The monitoring system control unit 110 may monitor the output of sensors 105b, 105c. Based on the aforementioned monitoring, the monitoring system control unit 110 may determine the current operating state of the light 142. For example, the monitoring system control unit 110 may determine, based on sensor data generated by the light sensor 105c, that the light 142 is powered on. In addition, the monitoring system control unit 110 may determine the state of the monitoring system 100. For example, the monitoring system control unit 110 may determine that the sensor 105b has not generated sensor data indicative of movement in Room B for more than a threshold period of time. Accordingly, current operating state of the light 142 and the state of the monitoring system as determined based on the output, or lack thereof, of sensors 105b, 105c, indicates that the no object is using Room B and the light 142 is on.

Based on the aforementioned the current operating state of the light 142 (e.g., powered on) and the state of the monitoring system 100 (e.g., no objects moving in Room B), the monitoring system control unit 110 determines that a manual control (e.g., a light switch 132) associated with the light 142 should be manipulated in order to adjust the light 142 from the current operating state (e.g., powered on) to a second operating state (e.g., powered off). Based on this determination, the monitoring system control unit 110 generate an instruction that instructs the drone 122 to navigate to the manual control such as a light switch 132 associated with the light 142 and manipulate the manual control associated with the light 142 to turn off the light 142. The monitoring system control unit 110 can transmit the generated instruction to the drone 122. In some implementations, the instruction may include a location of the manual control (e.g., light switch 132). In other implementations, the instruction may include an identifier of the light 142, an identifier of the manual control (e.g., light switch 132), or both, and the drone 122 can use one or more of the identifiers to obtain the location of the manual control (e.g., light switch 132) using a map of the property 110 stored by the drone 122.

In response to the instruction, the drone 122 may access a map of the property 101, and navigate on a flight path 117b towards a manual control associated with the light 142 such as light switch 132. The drone 122 may use a mechanical arm deployment unit 122a to deploy a mechanical arm 122b that is configured to engage the manual control (e.g., light switch 132) that is associated with light 142 in a manner that adjusts the light 142 from a current operating state (e.g., powered on) to a second operating state (e.g., powered off). For example, the drone 122 can use the mechanical arm 122b to manipulate the light switch 132, which results in turning the light 142 off. The drone 122 may manipulate the light switch 132 by, for example, using the mechanical arm 122b to flip the light switch 132 down.

With reference to Room C, the Room C may include a light 143 that is housed in a lamp that includes a manual control in the form of a chain 133. A user of user device 195 may leave the property 101 to go for a walk. After leaving the property 101, the user may realize that the user left the light 143 on. The user may access an application on the user device 195 that can communicate with the monitoring system control unit 110. The user can use the application to input a command to turn off the light 143 into the user device 195 and the user device 195 can transmit the command to the monitoring system control unit 110 via the network 180 and the network 150 using one or more communication links 152. In response to receiving the instruction from the user device 195, the monitoring system control unit 110 can instruct the drone 123 to turn off the light 143. In response to the instruction, the drone 123 may access a map of the property 101, and navigate on a flight path 117c to a manual control associated with the light 143 such as the chain 133. The drone 123 may use a mechanical arm deployment unit 123a to deploy a mechanical arm 123b that is configured to engage the chain 133. The drone 123 can then use the mechanical arm 120b to manipulate the chain 133, which results in turning the light 143 off. The drone 123 may manipulate the chain 133 by, for example, using the mechanical arm 123b to grasp and pull the chain 133.

With reference to Room D, the Room D may include a manual control for a garage door such as a garage door opener 170. The monitoring system 100 may determine that the current operating state of the garage door 172 based on sensor data, or lack thereof, generated by one or more sensors such as a sensor 150f. The one or more sensors 150f may include, for example, a contact sensor, a motion sensor, a temperature sensor, a wind sensor, a light sensor, a water sensor, or a combination thereof. The operating state of the garage door 172 may include data indicating whether the garage door 172 is opened or closed.

The monitoring system control unit 110 may also monitor the state of the monitoring system 100 (e.g., number of moving objects, time of day, armed away, armed stay, temperature, whether an alarm event is detected, number of alarm events detected, duration of a detected alarm event, or the like) and use the state of the monitoring system 100 to determine whether the garage door's 172 operating state should be altered. For example, the monitoring system control unit 110 can determine whether the garage door should be open or closed based on the current operating state of the garage door and the state of the monitoring system 100. For example, the monitoring system control unit 110 may determine that it is late at night (e.g., 1:00 am), there are no people moving in the property 101, and the garage door 172 is open sensor data generated by one or more sensors such as sensor 102f. Based on the state of the system 100 and the current operating status (e.g., open) of the garage door, the monitoring system control unit 110 may determine that the garage door 172 should be closed and instruct a drone 124 to close the garage door 172.

In response to the instruction, the drone 124 may access a map of the property 101, and navigate on a flight path 117d to a manual control associated with the garage door 172 such as garage door opener 170. The drone 124 may use a mechanical arm deployment unit 124a to deploy a mechanical arm 124b that is configured to engage the garage door opener 170. The drone 124 can then use the mechanical arm 124b to manipulate the garage door opener 170, which results in closing the garage door 172. The drone 124 may manipulate the garage door opener 170 by, for example, using the mechanical arm 124b to push the close button associated with the garage door opener 170.

In some implementations, the monitoring system control unit 110 may use other techniques to monitoring the operating state of the garage door 172. For example, the monitoring system control unit 110 may monitor the operating status of the garage door (e.g., whether the garage door is open or closed) using a garage door status flag maintained in the memory of the monitoring system control unit 110. In such instances, the monitoring system control unit may be configured to toggle a stored garage door status flag each time the garage door is opened or closed. Then, the monitoring system control unit 110 can determine the current operating state of the garage door 172 at any time based on the value of the stored garage door status flag.

The example of FIG. 1 describes one or more drones that may travel along a navigation path such as a flight path. Though implementations of the subject matter disclosed by the instant specification may utilize flying quadcopter drones, the present disclosure should not be so limited. Instead, any type of drone traveling on the ground, across water, through the air, or a combination thereof may be used in system 100.

Figure 2:
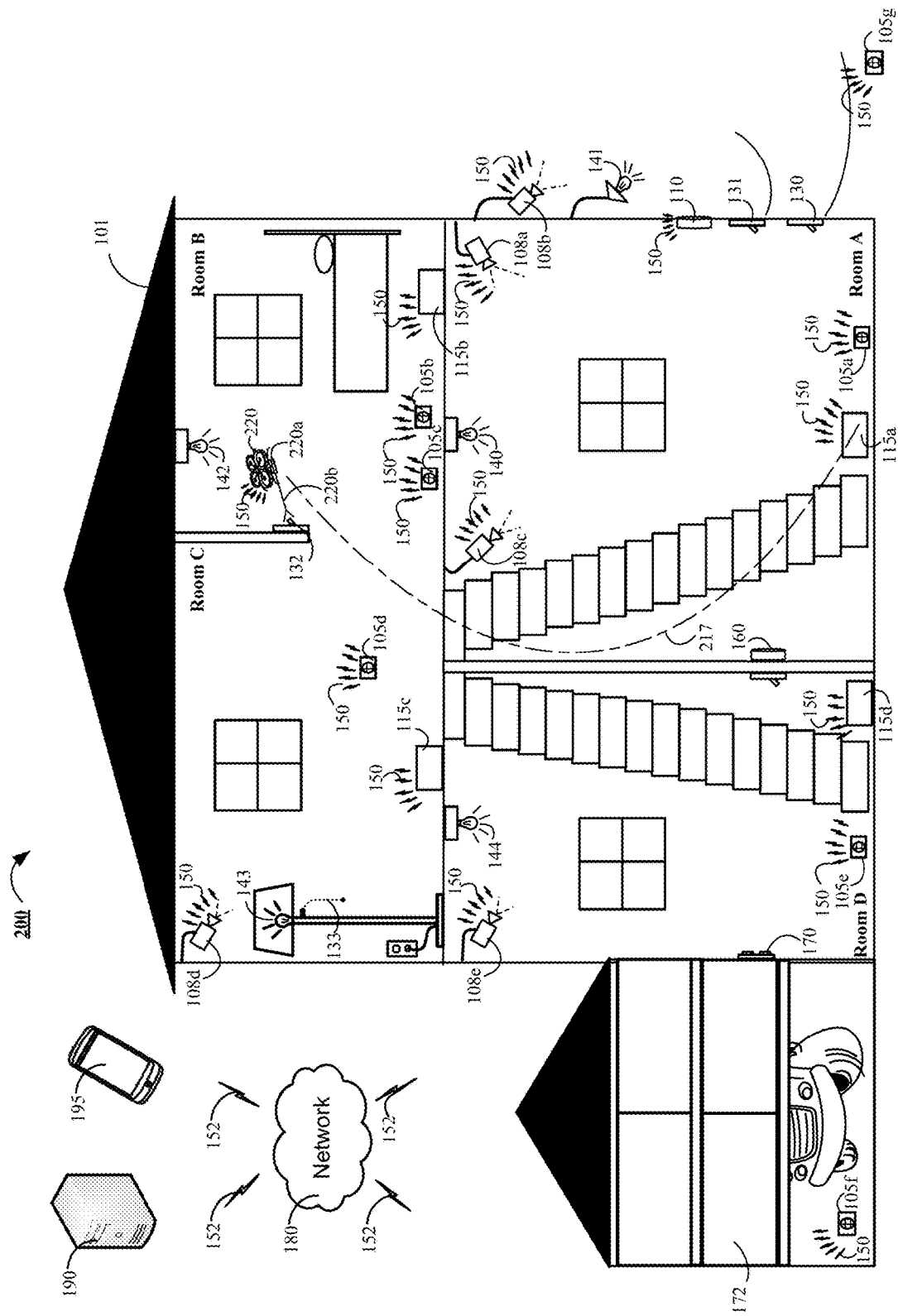
FIG. 2 is a contextual diagram of an example of a system that uses a drone to manipulate manual controls.

FIG. 2 is a contextual diagram of an example of a system 200 that uses a drone 220 to manipulate manual controls.

The system 200 is substantially similar to the system 100. For instance, the system 200 includes one or more sensors 105a, 105b, 105c, 105d, 105e, 105f, 105g, a monitoring system control unit 110, and one or more wireless charging stations 115a, 115b, 115c, 115d. In some implementations, the system 200 may also include one or more cameras 108a, 108b, 108c, 108d, 108e. In some implementations, the system 100 may also include a monitoring application server 190, a user device 195, or both. However, system 200 differs from system 100 in that system 200 may only include one drone such as drone 220.

In the example of FIG. 2, the drone 220 may be initially based on a wireless charging station 115a in Room A. The monitoring system control unit 110 may monitor the output of one or more motion sensors such as motion sensor 105b and one or more light sensors such as light sensor 105c. During such monitoring, and by way of example, the monitoring system control unit 110 may determine a current operating state of the light bulb 142 based on sensor data generated by a light sensor 105c that indicates that the light 142 is on.

In addition, the monitoring system control unit 110 may analyze the state of the monitoring system 100 to determine whether the current operating state of the light bulb 142 should be adjusted. For example, the monitoring system control unit 110 can determine that sensor 105b has not generated sensor data indicative of movement in Room B for more than a threshold period of time. Based on the current operating state of the light 142 (e.g., powered on) and the current state of the monitoring system 100 (e.g., determined based on output, or lack thereof, of sensors 105b, 105c), the monitoring system control unit 110 may determine that no person is using Room B and that the light 142 should be powered off. In response to a determination that no person is using Room B and that the light 142 should be powered off, the monitoring system control unit 110 may generate and transmit an instruction to the drone 220 that instructs the drone 220 to turn off the light 142.

In response to the instruction, the drone 220 may access a map of the property 101, and navigate on a flight path 217 to a manual control associated with the light 142 such as light switch 132. The drone 220 may use a mechanical arm deployment unit 220a to deploy a mechanical arm 220b that is configured to engage the light switch 132. The drone 220 can then use the mechanical arm 220b to manipulate the light switch 132, which results in turning the light 142 off. The drone 220 may manipulate the light switch 132 by, for example, using the mechanical arm 220b to flip the light switch down.

In some implementations, the drone 220 may return back to the wireless charging station 115a, or travel to a different wireless charging station such as wireless charging stations 115b, 115c, 115d in order to keep the drone's 220 battery charged. Alternatively, the drone 220 may continue to navigate around the property 101 to surveil the property, scan the property to identify new manual controls (or modified manual controls), or the like.

Figure 3:
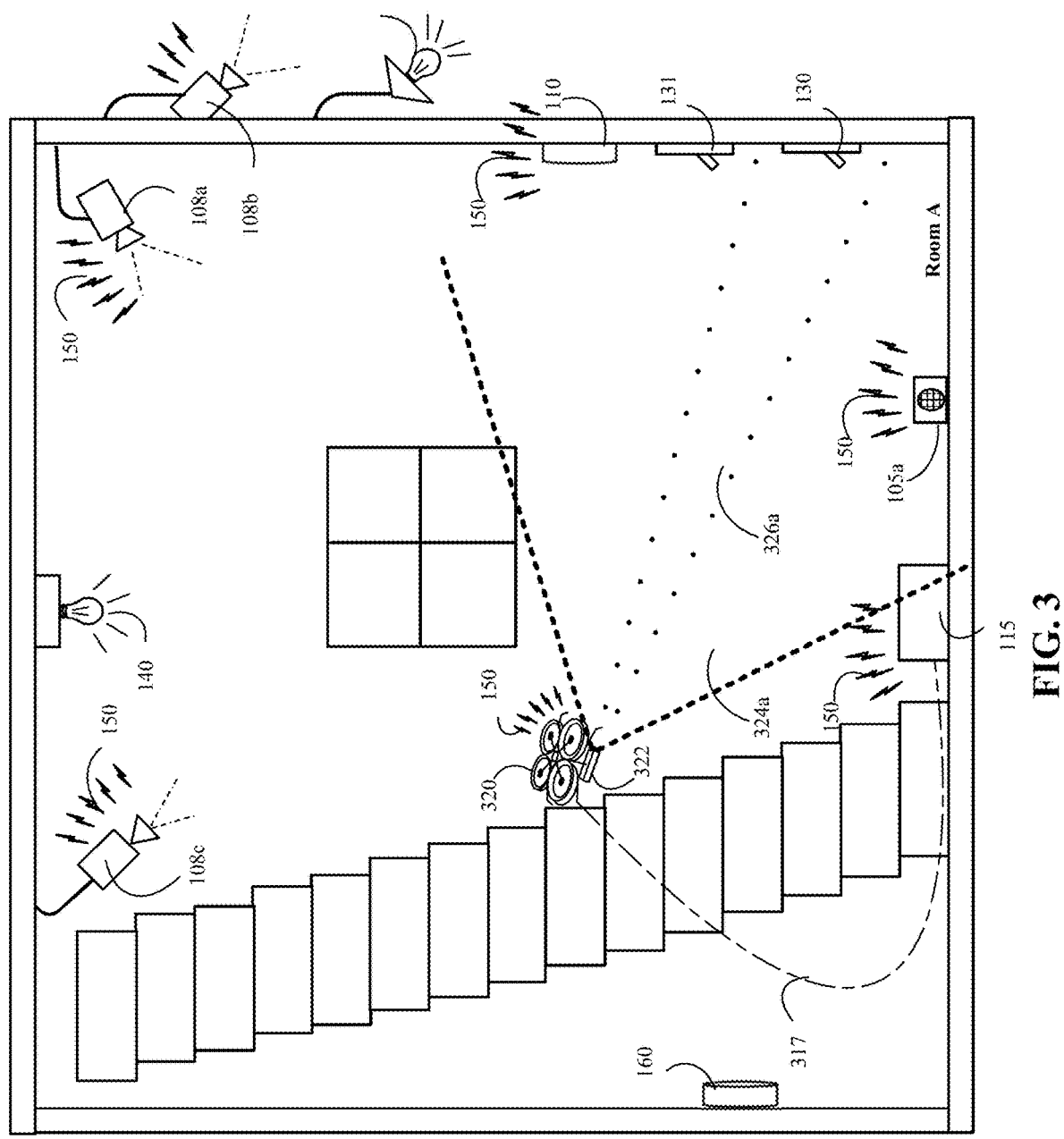
FIG. 3 is a contextual diagram of an example of a system that uses a drone to scan a room of a property to detect the presence of a manual control.

FIG. 3 is a contextual diagram of an example of a system that uses a drone to scan a room of a property to detect the presence of a manual control.

Detecting the presence of a manual control may begin with a drone 320 launching from a charging station 115 and beginning a navigation path 317 that will allow the drone 320 to travel through at least a portion of the property 101 such as Room A and identify one or more manual controls. The drone 320 may use a camera 322 to scan 324a the entire surface area of every wall in Room A. Scanning 324a a surface area of a wall may include, for example, using the camera 322 to a capture video images, still images, and the like of a wall from multiple different angles of a room.

The drone 320 may then use one or more machine learning models that were trained using machine learning techniques to detect the existence of one or more manual controls in Room A. For example, the drone 320 may be equipped with multiple trained machine learning models such as a control identification model, a control manipulation type model, or the like. The control identification model is trained to provide, in response to receipt of an input image, an output that includes a value indicating the likelihood that the received image shows a manual control (e.g., a light switch, a garage door controller, a thermostat interface, an over burner dial, a draw chain, or the like). In one implementation, the value may include a probability. The control manipulation type model is trained to provide, in response to receipt of an input image of a manual control, an output that includes a value indicating that the likelihood that the received image is associated with a particular control manipulation type (e.g., flick of a switch, push of a button, tap of a user interface, rotation of a dial, pull of a chain, or the like). In one implementation, the value may include a probability.

With reference to FIG. 3, the drone 320 may capture an image 326a of the light switch 130 while scanning Room A. The image 324a may be provided to a trained control identification model, and in response the control identification may output a value that indicates that the image includes a manual control. Then, after determining that the image includes a manual control, the drone 320 may provide the image 324a to a trained control manipulation type model, and in response the control manipulation model may output a value that indicates that the image 324a is associated with a "switch flick" control manipulation type.

In addition, the drone 320 may store a location of the light switch 130. The location of the light switch 130 may be determined in a number of different ways. For instance, the drone 320 may use one or more lasers, infrared (IR) sensors, or the like to measure the respective distance of each wall, the floor, and the ceiling from the drone's 320 current location. Alternatively, or in addition, the drone 320 may use one or more lasers, IR sensors, or the like to measure the respective distance of each wall, the floor, and the ceiling from the light switch 130. Alternatively, or in addition, the drone 320 may use the network 150 to access one or more live video feeds of the light switch 130 being streamed by one or more cameras 108a, 108c. The video feeds streamed from the cameras 108a, 108c, alone or in combination with other drone sensors, may allow the drone 320 to use multiple camera angles to better assess depth with respect to the light switch 130. The drone 320 can then determine the location of the light switch 130 based on the analysis of the video feeds from the cameras 180a, 108c, video feeds from one or more drone cameras 322, one or more drone sensors (e.g., lasers, IR sensors, or the like), or a combination thereof.

Figure 4:
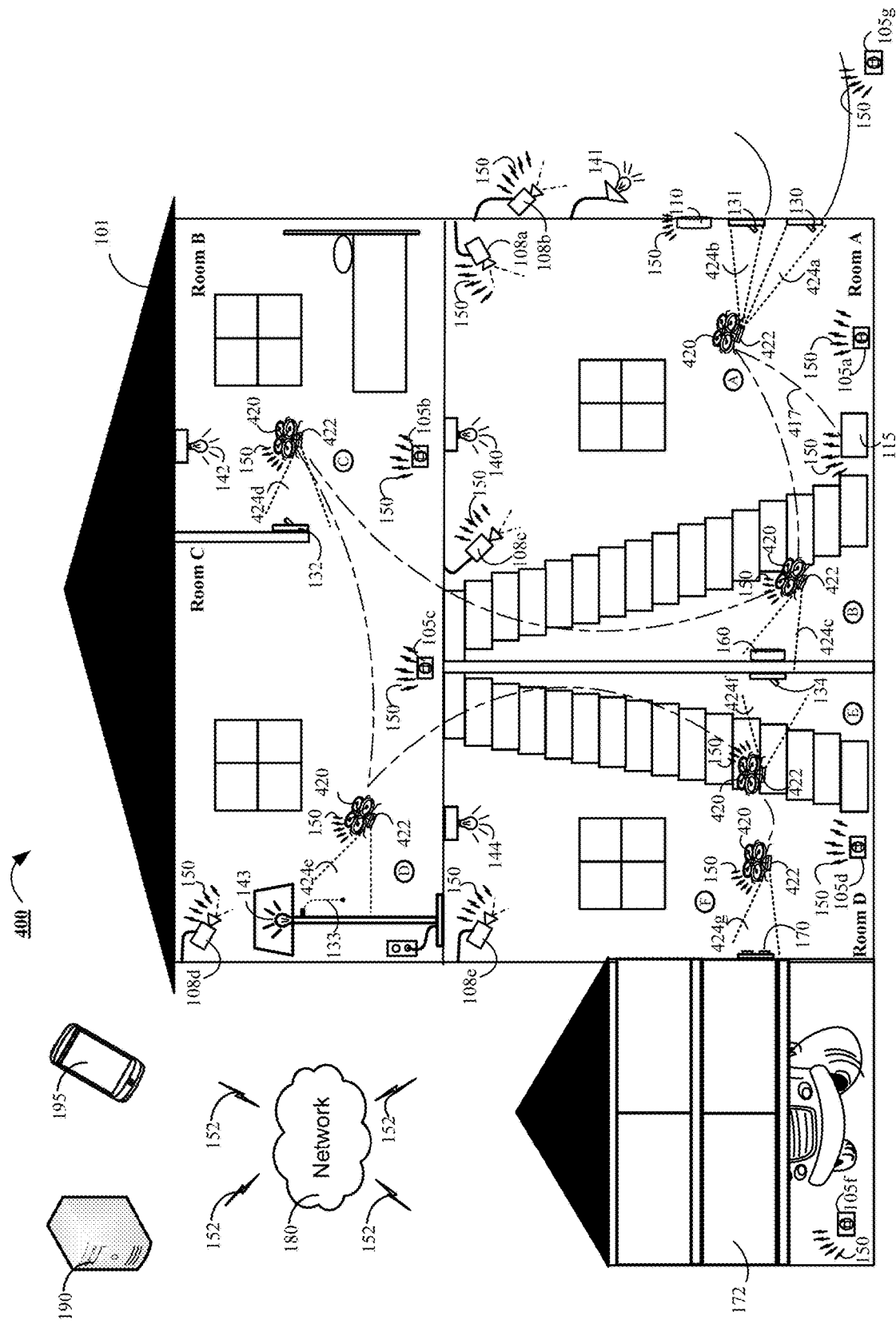
FIG. 4 is a contextual diagram of an example of a system that uses a drone to scan a property to generate a map of manual controls.

FIG. 4 is a contextual diagram of an example of a system 400 that uses a drone to scan a property to generate a map of manual controls.

The system 400 is substantially similar to the system 100. For instance, the system 400 includes one or more sensors 105a, 105b, 105c, 105d, 105e, 105f, 105g a monitoring system control unit 110, and at least one wireless charging stations 115. In some implementations, the system 400 may also include one or more cameras 108a, 108b, 108c, 108d, 108e. In some implementations, the system 400 may also include a monitoring application server 190, a user device 195, or both. However, system 400 can differ from system 100 in that system 400 may only include one drone such as drone 420 that is configured to generate a map of the manual controls in a property 101.

For example, the system of FIG. 4 includes a drone 420 that uses a camera 422 to scan the property 101 to identify manual controls. With reference to FIG. 4, the drone 420 may begin a flight path 417 at stage A, and scan the walls of Room A using the camera 422. The drone 420 may use the camera to capture images such as image 424a and 424b of portions of Room A that can be provided to one or more machine learning models that have been respectively trained to identify manual controls, trained to identify manual control manipulation types, or the like. The drone 420 may continue along the flight path 417 and obtain images 424c of the thermostat 160 at stage B, image 424d of the light switch 132 stage C, an image 424e of the draw chain 133 at stage D, an image 424f of the light switch 134 at stage E, and an image 424g of the garage door control unit 170 at stage F. The images may include a still image, a video image, or both. In some implementations, the images may include one or more still image frames that have been sampled from a video file. While scanning the property 101, the drone 420 may obtain other images in addition to images 424a, 424b, 424c, 424d, 424e, 424f, 424g. The other obtained images may not include any manual controls. In such instances, the drone 420 may have obtained, during the scanning of property 101, a set of images that includes one or more images depicting manual controls and one or more images that do not depict manual controls. The drone can decipher between images depicting manual controls and images that do not depict manual controls by using a trained manual control identification model.

For the images that are determined to include a manual control, the drone 420 may provide the respective image as an input to a trained control manipulation type model. The trained control manipulation type model may provide an indication of the type of control manipulation required to toggle the settings of the manual control. Types of control manipulation may include, for example, a switch flick, a tap of a button, a rotation of a dial, a pull of a chain, rotation of a deadbolt, a tap of a screen, or the like. After determining the manipulation control type, the drone may also determine the location of the manual control. For instance, at each respective stage such as stage A, stage B, stage C, stage D, stage E, and stage F, the drone may obtain the location of the respective manual control identified at each stage. The drone may then store, for each identified manual control of each stage, at least a manipulation type for the identified manual control and the location of the identified manual control. Alternatively, or in addition, the drone can also determine the entity (e.g., a device responsive to the manual control) that is associated with the manual control either automatically, or with the assistance of additional user input that associates a manual control with a particular entity such as a particular lightbulb.

The drone 420 may aggregate that data corresponding to each respective manual control (e.g., manual control location, manual control manipulation type data, entity associated with the manual control, or the like) that is obtained at each respective stage. The aggregated data may be mapped to a virtual map of the property to create a manual controls map. Then, the drone 420 may access the generated map of the property when navigating throughout the property to identify and manipulate a manual control at a later point in time.

Though the example of system 400 describes use of only a single drone 420 that is used to generate a map of the manual controls in a property 101, the present disclosure need not be so limited. For example, multiple drones may also be used to generate a map of the manual controls in a property 101. In such instances, a first drone may scan Room A and generate a map of the manual controls in Room A, another drone may scan Room B and generate a map of the manual controls in Room B, another drone may scan Room C and generate a map of the manual controls in Room C, and another drone may scan Room D and generate a map of the manual controls in Room D. Then, the maps from multiple different drones can be shared and combined to generate a complete map of the manual controls in property 101. Such map generation using multiple drones may be performed with any number of drones, and should not be limited to the example of four drone described here.

By way of example, each of the multiple drones may share the portions of the map each respective drone created with each of the other drones. Then, each respective drone can combine the shared maps received from other drones with the maps stored in the respective drone's memory. Alternatively, each of the multiple drones may upload the portion of the map each respective drone created to the monitoring system control unit 110, the monitoring application server 190, or the like. Then, the monitoring system control unit 110, the monitoring application server 190, or the like can combine the shared maps to generate a complete map of the manual controls in the property 101, and provide the combined map to each respective drone associated with the property 101.

In some implementations, the monitoring system control unit 110, the monitoring application server 190, or the like to may be used to generate a manual controls map of a property 101 in single drone systems. For instance, a single drone may scan the property 101, obtain location measurements, and the like, and then provide the data via one or more networks 150, 180 to the monitoring system control unit 110, monitoring application server 190, or the like which can generate the manual controls property map based on the received data.

Other variations may be employed that use multiple drones such as, for example, using one drone to map the downstairs portion of a property (e.g., Rooms A and D) and another drone to map the upstairs portion of a property (e.g., Rooms B and C), as necessary. Use of multiple drones to scan rooms of the property, and generate portions of the manual controls map for a particular property may increase the speed with which the manual controls map may be generated.

Figure 5:
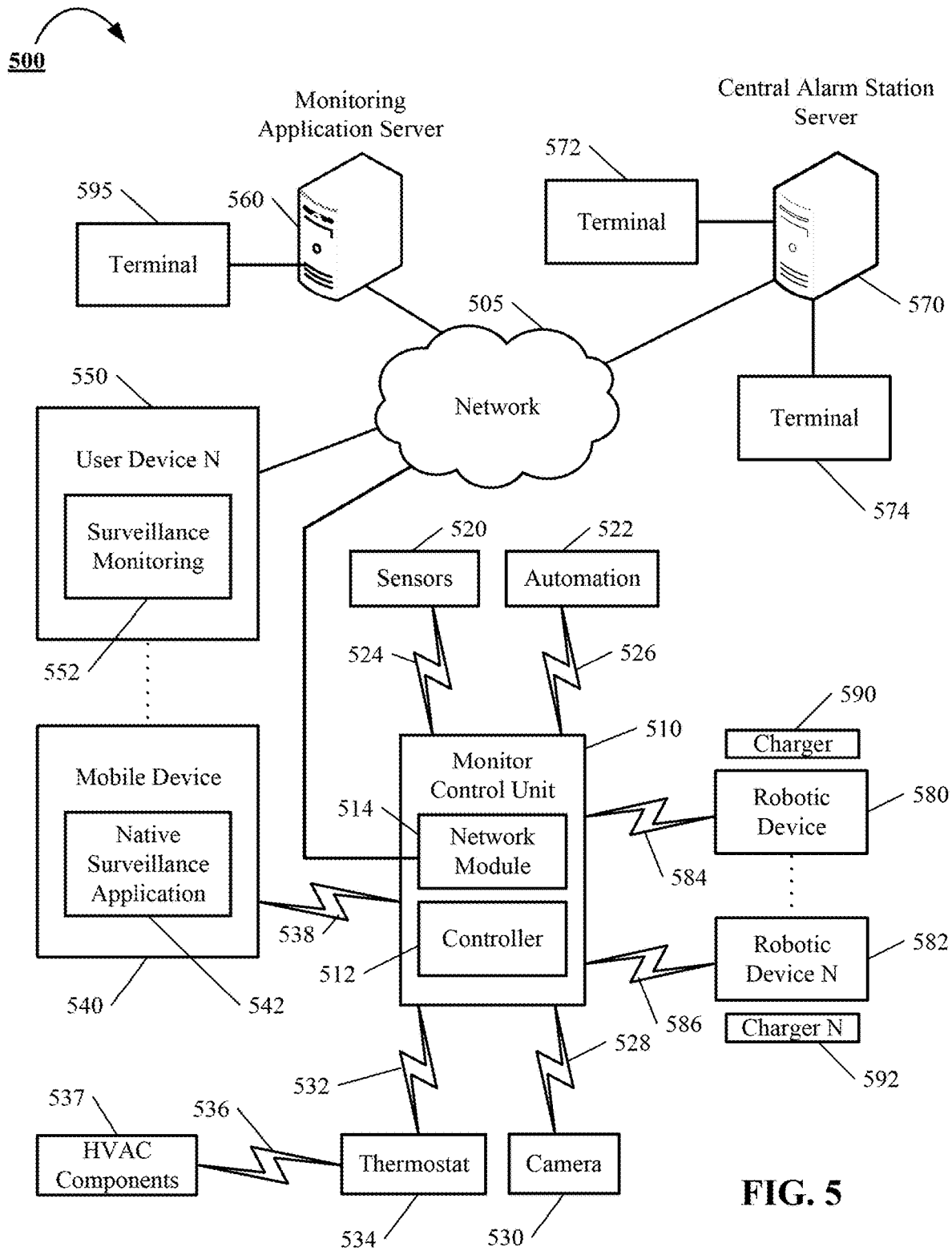
FIG. 5 is a block diagram of an example of a system that uses one or more drones to manipulate manual controls.

FIG. 5 is a block diagram of an example of a system that uses one or more drones to manipulate manual controls.

The electronic system 500 includes a network 505, a monitoring system control unit 510, one or more user devices 540, 550, a monitoring application server 560, and a central alarm station server 570. In some examples, the network 505 facilitates communications between the monitoring system control unit 510, the one or more user devices 540, 550, the monitoring application server 560, and the central alarm station server 570.

The network 505 is configured to enable exchange of electronic communications between devices connected to the network 505. For example, the network 505 may be configured to enable exchange of electronic communications between the monitoring system control unit 510, the one or more user devices 540, 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The monitoring system control unit 510 includes a controller 512 and a network module 514. The controller 512 is configured to control a monitoring system (e.g., a home alarm or security system) that includes the monitoring system control unit 510. In some examples, the controller 512 may include a processor or other control circuitry configured to execute instructions of a program that controls operation of an alarm system. In these examples, the controller 512 may be configured to receive input from sensors, detectors, or other devices included in the alarm system and control operations of devices included in the alarm system or other household devices (e.g., a thermostat, an appliance, lights, etc.). For example, the controller 512 may be configured to control operation of the network module 514 included in the monitoring system control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the monitoring system control unit 510 to communicate over a local area network and/or the Internet. The network module 514 also may be a voiceband modem configured to enable the alarm panel to communicate over the telephone lines of Plain Old Telephone Systems (POTS).

The monitoring system that includes the monitoring system control unit 510 includes one or more sensors or detectors. For example, the monitoring system may include multiple sensors 520. The sensors 520 may include a contact sensor, a motion sensor, a glass break sensor, or any other type of sensor included in an alarm system or security system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The monitoring system control unit 510 communicates with the module 522 and the camera 530 to perform surveillance or monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the monitoring system control unit 210. For instance, the module 222 may cause a lighting system to illuminate an area to provide a better image of the area when captured by a camera 230.

The monitoring system control unit 510 may monitor the on/off status of lights throughout a property. For instance, the monitoring system control unit 510 may use data received from lighting sensors, or the lack thereof, to determine whether a particular light is on or off. An identifier associated with each lighting sensor may be stored by the monitoring system control unit 510. The identifier of each respective lighting sensor may be associated with a particular room, a particular lighting unit, a particular manual control switch, or the like. Accordingly, based on data received, or a lack thereof, from one or more lighting sensors, the monitoring system control unit 510 may determine which rooms have lights on, which rooms have lights off, and the respective manual control switch that can be used to toggle the on/off status for each light. Identifying the respective manual control switch that can be used to toggle the on/off status for each particular light may be determined in a number of different ways.

For example, the respective switch for a particular light may be established through trial and error. By way of example, a robotic devices 580 and 582 can be deployed to a particular room, and instructed to manipulate one of multiple identified lights switches in a particular room. Then, based on output from one or more sensors such as light sensors in response to the manipulation of a particular light switch, the monitoring system control unit 510 may determine which particular light is associated with the manipulated switch. A manual control map of a property may then be updated to include data indicative of this association of a particular light and a particular light switch. In some instances, a robotic devices 580 and 582 may be equipped with one or more sensors, and capable of making similar decisions, without relying on the monitoring system control unit 510 to make an association between a particular light and a particular light switch. Alternatively, or in addition, once a manual control map is generated by one or more robotic devices 580, 520, a user may access the map via one or more devices 540, 550 and input data that associates a particular light with a particular manual control such as a light switch identified by the robotic device 540, 550. Other ways of associating particular entities such as lights with a particular manual control such as a light switch also fall within the scope of the present disclosure. It is contemplated that associations between other entities (e.g., stove burner dials, garage door controls, fans, thermostats, or the like) and their respective manual controls may be discovered in a similar manner.

The camera 530 may be a video/photographic camera or other type of optical sensing device configured to capture images. For instance, the camera 530 may be configured to capture images of an area within a building monitored by the monitoring system control unit 510. The camera 530 may be configured to capture single, static images of the area and also video images of the area in which multiple images of the area are captured at a relatively high frequency (e.g., thirty images per second). The camera 530 may be controlled based on commands received from the monitoring system control unit 510.

The camera 530 may be triggered by several different types of techniques. For instance, a Passive Infra Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the monitoring system control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the monitoring system control unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the monitoring system control unit 510 and can control the environmental (e.g., temperature) settings based on commands received from the monitoring system control unit 510.

In some implementations, the thermostat 534 is a dynamically programmable thermostat and can be integrated with the monitoring system control unit 510. For example, the dynamically programmable thermostat 534 can include the monitoring system control unit 510, e.g., as an internal component to the dynamically programmable thermostat 534. In addition, the monitoring system control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more robotic devices 580 and 582. The robotic devices 580 and 582 may be any type of robots that are capable of moving and taking actions that assist in security monitoring. For example, the robotic devices 580 and 582 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 580 and 582 may be robotic devices that are intended for other purposes and merely associated with the monitoring system 500 for use in appropriate circumstances. For instance, a robotic vacuum cleaner device may be associated with the monitoring system 500 as one of the robotic devices 580 and 582 and may be controlled to take action responsive to monitoring system events.

In some examples, the robotic devices 580 and 582 automatically navigate within a property. In these examples, the robotic devices 580 and 582 include sensors and control processors that guide movement of the robotic devices 580 and 582 within the property. For instance, the robotic devices 580 and 582 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 580 and 582 may include control processors that process output from the various sensors and control the robotic devices 580 and 582 to move along a path that reaches the desired destination and avoids obstacles. In this regard, the control processors detect walls or other obstacles in the property and guide movement of the robotic devices 580 and 582 in a manner that avoids the walls and other obstacles.

In addition, the robotic devices 580 and 582 may store data that describes attributes of the property. For instance, the robotic devices 580 and 582 may store a floorplan and/or a three-dimensional model of the property that can be used as a map to enable the robotic devices 580 and 582 to navigate the property. During initial configuration, the robotic devices 580 and 582 may receive the data describing attributes of the property, determine a frame of reference to the data (e.g., a home or reference location in the property), and navigate the property based on the frame of reference and the data describing attributes of the property. Further, initial configuration of the robotic devices 580 and 582 also may include learning of one or more navigation patterns in which a user provides input to control the robotic devices 580 and 582 to perform a specific navigation action (e.g., fly to an upstairs bedroom and spin around while capturing video and then return to a home charging base). In this regard, the robotic devices 580 and 582 may learn and store the navigation patterns such that the robotic devices 580 and 582 may automatically repeat the specific navigation actions upon a later request.

In addition, the robotic devices 580 and 582 may collect data that can be used to augment a set of initial attributes that the robotic devices 580 and 582 obtain related to a property. For instance, the robotic devices may be configured to scan a property to identify manual controls and obtain data about the identified manual controls. The obtained data about the identified manual controls may include the location of manual controls, the manipulation type of manual controls, and the entity associated with manual controls. The obtained manual control data may be projected onto an existing map of the property, and used to create a manual control map. Manual controls may include, for example, a light switch, oven controls, garage door controls, door locks, a thermostat user interface, or the like.

The robotic devices 580 and 582 also may include a communication module that enables the robotic devices 580 and 582 to communicate with the monitoring system control unit 510, each other, and/or other devices. The communication module may be a wireless communication module that allows the robotic devices 580 and 582 to communicate wirelessly. For instance, the communication module may be a Wi-Fi module that enables the robotic devices 580 and 582 to communicate over a local wireless network at the property. The communication module further may be a 900 MHz wireless communication module that enables the robotic devices 580 and 582 to communicate directly with the monitoring system control unit 510. Other types of short-range wireless communication protocols, such as Bluetooth, Bluetooth LE, Z-Wave, ZigBee, etc., may be used to allow the robotic devices 580 and 582 to communicate with other devices in the property.

The robotic devices 580 and 582 further may include processor and storage capabilities. The robotic devices 580 and 582 may include any suitable processing devices that enable the robotic devices 580 and 582 to operate applications and perform the actions described throughout this disclosure. In addition, the robotic devices 580 and 582 may include solid state electronic storage that enables the robotic devices 580 and 582 to store a manual control map of the property and one or more machine learning models. Alternatively, or in addition, the robotic devices 580 solid state electronic storage may include applications, configuration data, collected sensor data, collected video data, collected image data, and/or any other type of information available to the robotic devices 580 and 582.

The robotic devices 580 and 582 are associated with one or more charging stations 590 and 592. The charging stations 590 and 592 may be located at predefined home base or reference locations in the property. The robotic devices 580 and 582 may be configured to navigate to the charging stations 590 and 592 after completion of tasks needed to be performed for the monitoring system 500. For instance, after completion of a task such as manipulating a light switch to turn off a light in response to an instruction from the monitoring system control unit 510, a robotic device such as robotic devices 580 or 582 may be configured to automatically fly to and land on one of the charging stations 590 and 592. In this regard, the robotic devices 580 and 582 may automatically maintain a fully charged battery in a state in which the robotic devices 580 and 582 are ready for use by the monitoring system 500.

The charging stations 590 and 592 may be contact based charging stations and/or wireless charging stations. For contact based charging stations, the robotic devices 580 and 582 may have readily accessible points of contact that the robotic devices 580 and 582 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 580 and 582 may charge through a wireless exchange of power. In these cases, the robotic devices 580 and 582 need only locate themselves closely enough to the wireless charging stations for the wireless exchange of power to occur. In this regard, the positioning needed to land at a predefined home base or reference location in the property may be less precise than with a contact based charging station. Based on the robotic devices 580 and 582 landing at a wireless charging station, the wireless charging station outputs a wireless signal that the robotic devices 580 and 582 receive and convert to a power signal that charges a battery maintained on the robotic devices 580 and 582.

In some implementations, each of the robotic devices 580 and 582 has a corresponding and assigned charging station 590 and 592 such that the number of robotic devices 580 and 582 equals the number of charging stations 590 and 592. In these implementations, the robotic devices 580 and 582 always navigate to the specific charging station assigned to that robotic device. For instance, the robotic device 580 may always use changing station 590 and the robotic device 582 may always use changing station 592.

In some examples, the robotic devices 580 and 582 may share charging stations. For instance, the robotic devices 580 and 582 may use one or more community charging stations that are capable of charging multiple robotic devices 580 and 582. The community charging station may be configured to charge multiple robotic devices 580 and 582 in parallel. The community charging station may be configured to charge multiple robotic devices 580 and 582 in serial such that the multiple robotic devices 580 and 582 take turns charging and, when fully charged, return to a predefined home base or reference location in the property that is not associated with a charger. The number of community charging stations may be less than the number of robotic devices 580 and 582.

Also, the charging stations 590 and 592 may not be assigned to specific robotic devices 580 and 582 and may be capable of charging any of the robotic devices 580 and 582. In this regard, the robotic devices 580 and 582 may use any suitable, unoccupied charging station when not in use. For instance, when one of the robotic devices 580 and 582 has completed an operation or is in need of battery charge, the monitoring system control unit 510 references a stored table of the occupancy status of each charging station and instructs the robotic device to navigate to the nearest charging station that is unoccupied.

The sensors 520, the module 522, the camera 530, the thermostat 534, and the robotic devices 580 and 582 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the robotic devices 580 and 582 to the controller 512. The sensors 520, the module 522, the camera 530, the thermostat 534, and the robotic devices 580 and 582 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the robotic devices 580 and 582 and the controller 512 may exchange data and commands over the local network. The local network may include 802.11 "Wi-Fi_33" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the monitoring system control unit 510, the one or more user devices 540, 550, and the central alarm station server 570 over the network 505. For example, the monitoring application server 560 may be configured to monitor events (e.g., alarm events) generated by the monitoring system control unit 510. In this example, the monitoring application server 560 may exchange electronic communications with the network module 514 included in the monitoring system control unit 510 to receive information regarding events (e.g., alarm events) detected by the monitoring system control unit 510. The monitoring application server 560 also may receive information regarding events (e.g., alarm events) from the one or more user devices 540, 550.

In some examples, the monitoring application server 560 may route alarm data received from the network module 514 or the one or more user devices 540, 550 to the central alarm station server 570. For example, the monitoring application server 560 may transmit the alarm data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the monitoring system control unit 510, one or more robotic devices 580 and 582, the one or more user devices 540, 550, or a combination thereof.

The monitoring application server 560 may also include functionality to train one or more machine learning models. In one implementation, the machine learning models may trained using supervised deep learning algorithms. For instance, a control identification model may be trained by having the model process thousands, tens of thousands, hundreds of thousands, millions, or more labeled training images that include a manual control or that do not include a manual control. Images that include a manual control may include images of a light switch, a garage door opener, a stove burner knob, a door lock, a thermostat graphical user interface, or the like and a label. Images that do not include a manual control may include images of features of houses, office buildings, warehouses, factories, military installations or the like that do not include a manual control such as a portion of a wall, a door, a picture frame with picture, a wreath, a heating/cooling system vent, a chair, a table, a cubicle, a stack of papers, or the like. The label associated with each training image may include metadata that provides a particular class that is associated with the image. For example, the class of an image may be labeled as a manual control or not a manual control. The training images may be labeled by one or more human users. The labeled training data items may be obtained from third party source. The third party source may be a publicly available source. In some implementations, the third party source (or other party) may obtain the training data images by aggregating images of manual controls that were captured from homes of a network of homes. Training of a machine learning model may be directed by a user of terminal 595.

In as similar manner, the application monitoring server may also include functionality to train a control manipulation type model. The control manipulation type model may be trained by having the model process thousands, tens of thousands, hundreds of thousands, millions, or more labeled training images of manual controls. The training images may include an image of a manual control type (e.g., a light switch, a garage door opener, a stove burner knob, draw chain, a door lock, a thermostat graphical user interface, or the like) and a label. The label may include metadata that provides a particular class that is associated with the image of the manual control. The class of the manual control may be the control manipulation type (e.g., switch flick, tap of a button, rotation of a dial, pull of a chain, rotation of a deadbolt, tap of a screen, or the like). The training images may be labeled by one or more human users. The labeled training data items may be obtained from third party source. The third party source may be a publicly available source. In some implementations, the third party source (or other party) may obtain the training data images by aggregating images of manual controls that were captured from homes of a network of homes. Training of a machine learning model may be directed by a user of terminal 595.

The machine learning models (e.g., the control identification model and the control manipulation type model) may include a neural network, a deep neural network, or the like. The neural network may include an input layer for inputting training data items, multiple hidden layers for processing training data items, and an output layer for providing output. A vector may be generated for each training data item, and provided as an input to the neural network. The hidden layers may process the received training vectors during training. Each hidden layer may be associated with one or more weights. The output of the final hidden layer is an activation vector that may be provided to the output layer, which performs additional computations on the received activation vector to generate a neural network output. The weights or other parameters of the neural network may each be adjusted during training until the neural network begins to produce a target outputs by the output layer that each correspond to the respective label assigned to respective training data items processed by the neural network. Once the neural network reaches a desired level of performance, the neural network may be designated as trained.

Once trained, the machine learning models may be provided to robotic devices 580 and 582 via the network 505. The robotic devices 580 and 582 may use the machine learning models when scanning a property to generate a manual control map. The manual control map may include a full visual map of a property such as a house that includes the location of manual controls such as light switches, the manipulation type associated with the manual control (e.g., flick of a switch), and the entity that the manual control corresponds to (e.g., a particular light in a particular room of the property). The robotic 580 and 582 can scan each room of the property to identify manual controls and the manipulation type associated with each respective manual control using one or more machine learning models installed on the robotic devices 580 and 582.

In addition, the robotic devices 580 and 582 can use one or more sensors, or other devices such as lasers, to determine the respective location of each manual control. For example, the robotic devices 580 and 582 can fly within a predetermined proximity of a manual control, and then use lasers to measure the distance from each wall in the room where the manual control exists, as well as the distance from the robotic devices 580 and 582 to the ceiling and floor. Alternatively, or in addition, the robotic devices 580 and 582 may access a video feed from one or more cameras 530 when approaching a manual control. The accessed video feed may be used by the robotic devices 580 and 582 in assessing the depth of the manual control. The robotic devices 580 and 582 may also determine based on the sensor identifiers associated with sensors in the room which room of the property a manual control resides.

For example, the monitoring system control unit 510, the monitoring application server 595, or some other computer may store a record for each sensor that is installed in a property. The stored records, in sum, may be referred to as a sensor registry. The records in the sensor registry may include at least a sensor identifier, the type of sensor, and the location of the sensor within the property. During scanning of a property, robotic devices 580 and 582 can obtain a sensor identifier of one or more sensors in a room, access the sensor registry stored by the monitoring system control unit 510, the monitoring application server 560, or some other computer using one or more networks 505, and access the location of the registered sensor that corresponds to the obtained sensor identifier.

In some implementations, the robotic devices 580 and 582 can also determine the entity (e.g., light bulb) with which manual control is associated with. For example, if there is one light switch in a room and one lightbulb, then the robotic devices 580 and 582 may determine that the lightbulb is associated with the switch. Alternatively, or in addition, the robotic devices 580 and 582 may also manipulate the manual control to determine which entity (e.g., light bulb, stove, door lock, etc.) in the room responds to the manipulation of the manual control (e.g., light switch, burner dial, deadbolt, etc.). Alternatively, or in addition, a user may provide input data that associates a particular identified control with a particular entity.

The robotic devices 580 and 582 may aggregate obtained data that corresponds to each identified manual control. The obtained data for each manual control may include a location of the identified manual control, the manipulation type associated with the identified manual control, and the entity that the manual control corresponds. A manual control map may be generated based on the aggregated data. Generating the manual control map may include, for example, projecting the aggregated data onto a virtual map of the property. The aggregated data may be projected onto a virtual map of the property in a manner that maintains the location of each respective manual control. For instance, a data point may be projected onto a portion of a virtual map of Room A that corresponds to the particular portion of actual Room A where the manual control exists, as measured by the robotic devices 580 and 582 when the manual control data was collected during scanning. Then, the robotic devices 580 and 582 may access the generated map when navigating throughout the property to identify and manipulate a manual control.

The central alarm station server 570 is an electronic device configured to provide alarm monitoring service by exchanging communications with the monitoring system control unit 510, the one or more robotic devices 580 and 582, the one or more mobile devices 540, 550, and the monitoring application server 560 over the network 505. For example, the central alarm station server 570 may be configured to monitor alarm events generated by the monitoring system control unit 510. In this example, the central alarm station server 570 may exchange communications with the network module 514 included in the monitoring system control unit 510 to receive information regarding alarm events detected by the monitoring system control unit 510. The central alarm station server 570 also may receive information regarding alarm events from the one or more mobile devices 540, 550, one or more robotic devices 580 and 582, and/or the monitoring application server 560.

The central alarm station server 570 is connected to multiple terminals 572 and 574. The terminals 572 and 574 may be used by operators to process alarm events. For example, the central alarm station server 570 may route alarm data to the terminals 572 and 574 to enable an operator to process the alarm data. The terminals 572 and 574 may include general-purpose computers (e.g., desktop personal computers, workstations, or laptop computers) that are configured to receive alarm data from a server in the central alarm station server 570 and render a display of information based on the alarm data. For instance, the controller 512 may control the network module 514 to transmit, to the central alarm station server 570, alarm data indicating that a sensor 520 detected a door opening when the monitoring system was armed. The central alarm station server 570 may receive the alarm data and route the alarm data to the terminal 572 for processing by an operator associated with the terminal 572. The terminal 572 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540, 550 are devices that host and display user interfaces. For instance, the user device 540 is a mobile device that hosts one or more native applications (e.g., the native surveillance application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a native surveillance application 542. The native surveillance application 542 refers to a software/firmware program running on the corresponding mobile device that enables the user interface and features described throughout. The user device 540 may load or install the native surveillance application 542 based on data received over a network or data received from local media. The native surveillance application 542 runs on mobile devices platforms, such as iPhone, iPod touch, Blackberry, Google Android, Windows Mobile, etc. The native surveillance application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the monitoring system control unit 510 over the network 505. The user device 550 may be configured to display a surveillance monitoring user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540, 550 communicate with and receive monitoring system data from the monitoring system control unit 510 using the communication link 538. For instance, the one or more user devices 540, 550 may communicate with the monitoring system control unit 510 using various local wireless protocols such as Wi-Fi, Bluetooth, Z-Wave, ZigBee, HomePlug (Ethernet over powerline), or wired protocols such as Ethernet and USB, to connect the one or more user devices 540, 550 to local security and automation equipment. The one or more user devices 540, 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540, 550 are shown as communicating with the monitoring system control unit 510, the one or more user devices 540, 550 may communicate directly with the sensors and other devices controlled by the monitoring system control unit 510. In some implementations, the one or more user devices 540, 550 replace the monitoring system control unit 510 and perform the functions of the monitoring system control unit 510 for local monitoring and long range/offsite communication.

In other implementations, the one or more user devices 540, 550 receive monitoring system data captured by the monitoring system control unit 510 through the network 505. The one or more user devices 540, 550 may receive the data from the monitoring system control unit 510 through the network 505 or the monitoring application server 560 may relay data received from the monitoring system control unit 510 to the one or more user devices 540, 550 through the network 505. In this regard, the monitoring application server 560 may facilitate communication between the one or more user devices 540, 550 and the monitoring system.

In some implementations, the one or more user devices 540, 550 may be configured to switch whether the one or more user devices 540, 550 communicate with the monitoring system control unit 510 directly (e.g., through link 538) or through the monitoring application server 560 (e.g., through network 505) based on a location of the one or more user devices 540, 550. For instance, when the one or more user devices 540, 550 are located close to the monitoring system control unit 510 and in range to communicate directly with the monitoring system control unit 510, the one or more user devices 540, 550 use direct communication. When the one or more user devices 540, 550 are located far from the monitoring system control unit 510 and not in range to communicate directly with the monitoring system control unit 210, the one or more user devices 540, 550 use communication through the monitoring application server 560.

Although the one or more user devices 540, 550 are shown as being connected to the network 505, in some implementations, the one or more user devices 540, 550 are not connected to the network 505. In these implementations, the one or more user devices 540, 550 communicate directly with one or more of the monitoring system components and no network (e.g., Internet) connection or reliance on remote servers is needed.

In some implementations, the one or more user devices 540, 550 are used in conjunction with only local sensors and/or local devices in a house. In these implementations, the system 500 only includes the one or more user devices 540, 550, the sensors 520, the module 522, the camera 530, and the robotic devices 580 and 582. The one or more user devices 540, 550 receive data directly from the sensors 520, the module 522, the camera 530, and the robotic devices 580 and 582 and sends data directly to the sensors 520, the module 522, the camera 530, and the robotic devices 580 and 582. For example, devices may receive data from a light sensor and one or more motion sensors. In such instances, the received data may generate a user notification indicating that one or more lights have been left on in one or more respective rooms where no movement has been detected for more than a threshold period of time. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices 580 and 582 are configured to communicate sensor and image data to the one or more user devices 540, 550 over network 505 (e.g., the Internet, cellular network, etc.). In yet another implementation, the sensors 520, the module 522, the camera 530, the thermostat 534, and the robotic devices 580 and 582 (or a component, such as a bridge/router) are intelligent enough to change the communication pathway from a direct local pathway when the one or more user devices 540, 550 are in close physical proximity to the sensors 520, the module 522, the camera 530, the thermostat 534, and the robotic devices 580 and 582 to a pathway over network 505 when the one or more user devices 540, 550 are farther from the sensors 520, the module 522, the camera 530, the thermostat 534, and the robotic devices 580 and 582. In some examples, the system leverages GPS information from the one or more user devices 540, 550 to determine whether the one or more user devices 540, 550 are close enough to the sensors 520, the module 522, the camera 530, the thermostat 534, and the robotic devices 580 and 582 to use the direct local pathway or whether the one or more user devices 540, 550 are far enough from the sensors 520, the module 522, the camera 530, the thermostat 534, and the robotic devices 580 and 582 that the pathway over network 505 is required. In other examples, the system leverages status communications (e.g., pinging) between the one or more user devices 540, 550 and the sensors 520, the module 522, the camera 530, the thermostat 534, and the robotic devices 580 and 582 to determine whether communication using the direct local pathway is possible. If communication using the direct local pathway is possible, the one or more user devices 540, 550 communicate with the sensors 520, the module 522, the camera 530, the thermostat 534, and the robotic devices 580 and 582 using the direct local pathway. If communication using the direct local pathway is not possible, the one or more user devices 540, 550 communicate with the sensors 520, the module 522, the camera 530, the thermostat 534, and the robotic devices 580 and 582 using the pathway over network 505.

In some implementations, the system 500 provides end users with access to images captured by the camera 530 to aid in decision making. For example, the system 500 may provide an image, video, or the like of a room in the property that has a light left on. The light left on may be detected based on the readings of one or more light sensors, one or more motion sensors, other similar sensors, or a combination thereof, that are located throughout a property. The system 500 may transmit the images captured by the camera 530 over a wireless WAN network to the user devices 540, 550. Because transmission over a wireless WAN network may be relatively expensive, the system 200 uses several techniques to reduce costs while providing access to significant levels of useful visual information. In response to receipt of data that indicates one or more lights were left on in a property, a user of the user device 540, 550 may input an instruction for one or more robotic device to turn off the light. One or more robotic devices 580 and 582 may (i) receive the instruction directly from the user device 540, 550 or indirectly after the instruction is received by, and forwarded from, a monitoring system control unit 510, (ii) access a stored map that provides the location of the manual control associated with the light, (iii) navigate to the manual control associated with the light, (iv) deploy a mechanical arm, and (v) use the mechanical arm to manipulate the manual control associated with the light to turn off the light.

Other types of images may be provided to the user in a similar manner. For instance, an image (or video) from a camera 530 may be transmitted to a user device 540, 550 that shows user an open garage door. The open garage door may be detected based on the value of a garage door status flag, one or more temperature sensors in the garage, one or more water sensors in the garage, one or more motion sensors, other similar sensors, or a combination thereof that are located in the garage and throughout the property. In response, the user of the user device 540, 550 may input an instruction for one or more robotic devices 580,582 to close the garage door. One or more robotic devices 580 and 582 may (i) receive the instruction directly from the user device 540, 550 or indirectly after the instruction is received by, and forwarded from, the monitoring system control unit 510, (ii) access a stored map that provides the location of the manual control associated with the garage door, (iii) navigate to the manual control associated with the garage door, (iv) deploy a mechanical arm, and (v) use the mechanical arm to manipulate the manual control associated with the garage door to shut the garage door.

Yet other types of manual controls may be adjusted in a similar manner. For instance, an image (or video) from a camera 530 may be transmitted to a user device 540, 550 that show an oven burner left on. The burner may have been detected by a monitoring system control unit 510 based on a reading from one or more temperature sensors, motion sensors, other similar sensors, or a combination thereof, that are located in a kitchen and throughout a property. For instance, the temperature sensors may report temperatures greater than a predetermined threshold with no movement detected for more than a threshold period of time. In response to the image (or video) of a burner that was left on, the user of the user device 540, 550 may input an instruction for one or more robotic devices 580 and 582 to turn off the oven burner. One or more robotic devices 580 and 582 may (i) receive the instruction directly from the user device 540, 550 or indirectly after the instruction is received by, and forwarded from, the monitoring system control unit 510, (ii) access a stored map that provides the location of the manual control associated with the oven, (iii) navigate to the manual control associated with the oven, (iv) deploy a mechanical arm, and (v) use the mechanical arm to manipulate the manual control associated with the oven burner to shut off the burner.

Yet other types of manual controls may be adjusted in a similar manner. For instance, an image (or video) from a camera 540 may be transmitted to a user device 540, 550 that show that a faucet was left on and is currently running water. The faucet running water may have been detected by a monitoring system control unit 510 based on a reading from one or more water sensors, motion sensors, other similar sensors, or a combination thereof, that are located a room with the faucet or throughout a property. In response to the image (or video) of the faucet running water, the user of the user device 540, 550 may input an instruction for one or more robotic devices 580 and 582 to turn off the faucet. One or more robotic devices 580 and 582 may (i) receive the instruction directly from the user device 540, 550 or indirectly after the instruction is forwarded from the monitoring system control unit 510, (ii) access a stored map that provides the location of the manual control unit associated with the faucet, (iii) navigate to the manual control associated with the faucet, (iv) deploy a mechanical arm, and (v) use the mechanical arm to manipulate the manual control associated with the faucet to turn the faucet off. Numerous other examples also fall within the scope of the subject matter disclosed by this specification.

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

Further, in some implementations, the system 500 intelligently leverages the robotic devices 580 and 582 to aid in security monitoring, property automation, and property management. For example, the robotic devices 580 and 582 may aid in investigating alarm events detected at the property by the monitoring system control unit 510. In this example, the monitoring system control unit 510 may detect an event (e.g., a light left on, a burner left on, a faucet left on, a garage door left open, or the like) and, based on the detected event, control the robotic devices 580 and 582 to attempt to capture still images, video, or the like that can be provided to a user device 540, 550. Each of the robotic devices 580 and 582 may execute a predefined navigation pattern within the property or the robotic devices 580 and 582 based on a stored map of the property. The map may have been previously generated by using one or more robotic devices 580 and 582 to execute a coordinated scan of the property in which the robotic devices 580 and 582 exchange location information and navigate to areas that have not been explored by one of the other devices.

In some examples, the robotic devices 580 and 582 may be assigned to different areas of the property where the robotic devices 580 and 582 can move in an unobstructed manner. In these examples, the robotic devices 580 and 582 may be assigned to different levels in a property (e.g., an upstairs robotic device and a downstairs robotic device) and even different rooms or sections that are potentially blocked by doors. The monitoring system control unit 510 coordinate tracking movement based on the assigned areas. For instance, the monitoring system control unit 510 determines areas in a property where an event has been detected (e.g., where light is on and no movement detected for more than threshold period of time, where increased temperature is detected and not movement detected for more than a threshold period of time, or the like) and only controls the robotic devices assigned to the determined areas to operate.

In addition, the robotic devices 580 and 582 may be assigned as interior and exterior devices. The interior devices may navigate throughout an interior of the property. The exterior devices may navigate about an exterior periphery of the property. The exterior devices may be weather conditioned to remain outdoors (e.g., in an outdoor enclosure) at all times such that the exterior devices can explore an exterior of the property at any suitable time. In addition, the exterior devices may remain inside the property and the monitoring system control unit 510 may open a door to enable an exterior robotic device to leave and return to the property. For instance, an exterior device may have a base or reference location in a garage of the property and the monitoring system control unit 510 may automatically open a garage door to allow the exterior device to leave the garage and explore the exterior of the property.

In some implementations, the monitoring system control unit 510 may monitor operational status of the robotic devices 580 and 582 and coordinate further operation based on the operational status. In these implementations, the monitoring system control unit 510 may detect that a particular robotic device is no longer operational and control one or more other robotic devices to perform operations originally assigned to the non-operational robotic device.

In some implementations, the monitoring system control unit 510 may determine battery power available for each of the robotic devices 580 and 582 and coordinate operation of the robotic devices 580 and 582 based on available battery power. In these implementations, the robotic devices 580 and 582 may report battery power remaining to the monitoring system control unit 510 and the monitoring system control unit 510 may determine a subset of the robotic devices 580 and 582 to deploy based on the battery power information. For instance, the monitoring system control unit 510 may select to initially deploy the robotic device with the most available battery power to allow the other robotic devices to charge while the selected device assists with monitoring. Once the battery power for the selected device falls below a threshold, the monitoring system control unit 510 may return the selected device to a charging station and select the robotic device with the presently highest available battery power to resume the monitoring options being performed. The monitoring system control unit 510 may cycle through all of the robotic devices 580 and 582 in an intelligent manner that best leverages the battery power available. If the battery power of a device becomes too low to effectively operate as a navigating device, the monitoring system control unit 510 may control the robotic device to remain stationary and act as a stationary camera or other sensor to still assist with monitoring, although the added benefit of navigation no longer exists.

In some implementations, the system 500 allows central station operators, first responders, and/or users of the property to interact with and control the robotic devices 580 and 582. In these implementations, a central station operator, first responder, or user of the property may provide input to control the robotic devices 580 and 582 in a manner that best assists with monitoring and investigation of detected events. For instance, the central station operator, first responder, or user of the property may remotely control navigation of the robotic devices 580 and 582. The central station operator, first responder, or user of the property also may provide general commands related to actions the robotic devices 580 and 582 are designed to take. Alternatively, or in addition, a central station operator, first responder, or user of the property may take control of the robotic devices 580 and 582. For example, a user may use a user device 540, 550 to direct navigation of the robotic devices 580 and 582, remotely control the robotic device's 580 and 582 mechanical arm, or the like. Such control may be beneficial in instances where the robotic devices 580 and 582 encounter a problem in manipulating a manual control.

In some examples, the robotic devices 580 and 582 may periodically perform test sequences to ensure the robotic devices 580 and 582 will operate correctly if needed. In these examples, the robotic devices 580 and 582 may periodically navigate predefined navigation patterns used to investigate the property and/or may navigate around the property in a scanning sequence. The robotic devices 580 and 582 may determine whether the test sequences perform correctly or whether an error occurs that prevents full investigation of the property. To the extent an error occurs, the robotic devices 580 and 582 report the error and enable a user of the property or a technician to correct the error prior to a time when the robotic devices 580 and 582 would be needed for safety monitoring. For example, the monitoring system control unit 510 may periodically instruct a robotic device 580 and 582 to navigate to a particular manual control and manipulate the manual control.

The monitoring system control unit 510 also may arrange the test sequences to occur during periods of time that are convenient for users of the property. For example, the monitoring system control unit 510 may assess sensor data at the property and determine a time period in which the property is unoccupied and unlikely to be occupied until the test sequences complete. In this example, the monitoring system control unit 510 waits until the preferred time period to initiate test sequences for one or more of the robotic devices 580 and 582.

In some implementations, the robotic devices 580 and 582 may operate as mobile sensors that move throughout the property. In these implementations, the robotic devices 580 and 582 may have temperature sensors that can be used as inputs to a thermostat at the property. In this regard, the robotic devices 580 and 582 may navigate throughout the property and take temperature measurements at various locations in the property. With the temperatures at various locations, the system 500 may identify hot and/or cold spots in the property and adjust thermostat operation accordingly. For instance, the robotic devices 580 and 582 may be deployed to take temperature measurements in areas of the property where people are located and the thermostat may be adjusted to improve the temperature in the location where people are actually located in the property.

In some examples, the robotic devices 580 and 582 may have humidity and air flow sensors in addition to temperature sensors. In these examples, the robotic devices 580 and 582 may periodically navigate throughout the property and take temperature, humidity, and air flow measurements at various locations throughout the property. The system 500 may use the temperature, humidity, and air flow measurements to detect inefficient areas of the property. The inefficiencies may be used to detect areas where insulation in the property in deficient (e.g., new siding, windows, and/or doors may be useful in certain areas) and/or where leaks exist in the property. The property efficiency information may be provided to a user of the property to enable the user to improve efficiency in the property.

Figure 6:
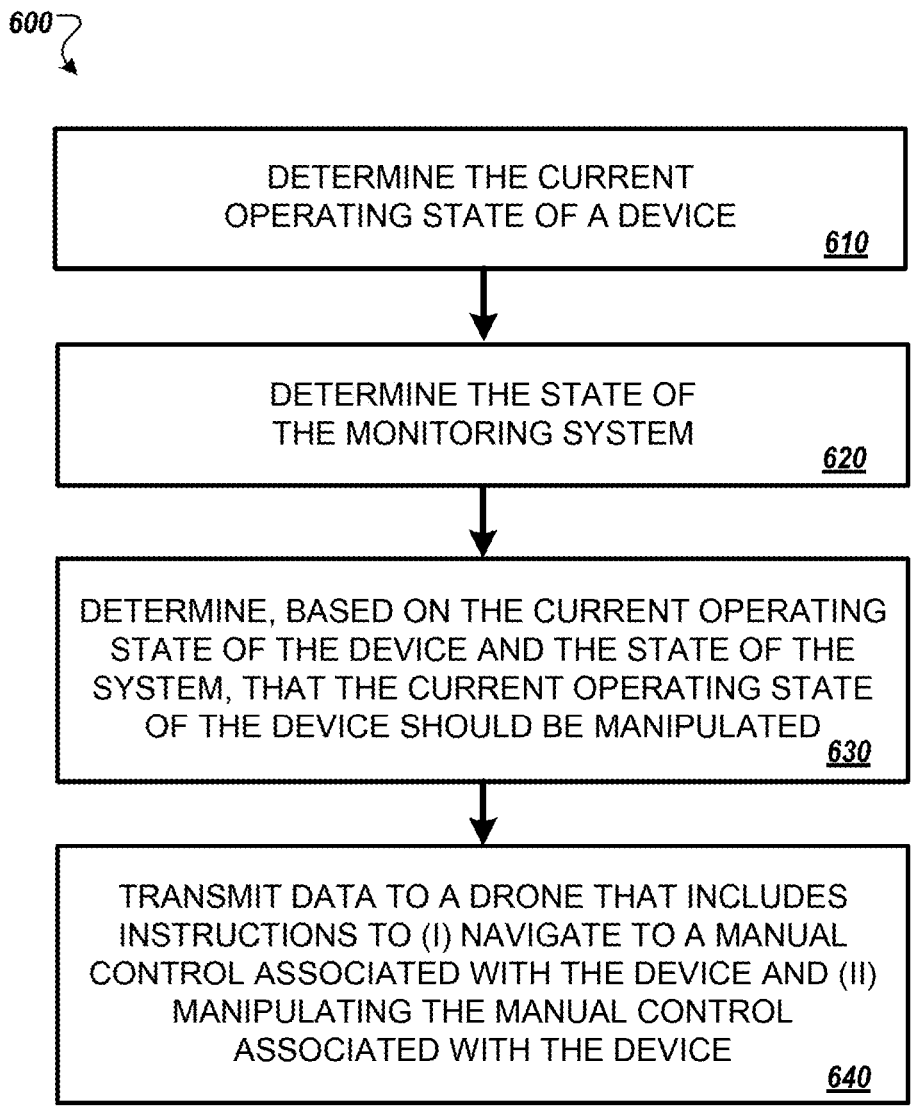
FIG. 6 is a flowchart of an example of a process for turning off a light using a drone.

FIG. 6 is a flowchart of an example of a process 600 for turning off a light using a drone. In general, the process 600 may include determining the current operating state of the light (610), determining the state of the monitoring system (620), determining based on the current operating state of the light and state of the monitoring system 100 that the light should be turned off (630), and transmitting data to a drone that includes instructions to (i) navigate to a switch associated with the light, and (ii) manipulate the light switch (640).

In more detail, the process 600 may begin with a monitoring system control unit determining the current operating state of a device at stage 610. The device may include, for example, a light, a garage door, a thermostat, an oven, a door lock, or the like. Determining the current operating state of the device may include, for example, determining one or more current settings of the device. For example, the monitoring system control unit may determine whether a light powered on or powered off, whether a garage door is opened or closed, a temperature setting of a thermostat, whether an oven is consuming electricity or gas to generate heat, whether a door lock is locked or unlocked, or the like. The monitoring system control unit may make each of the aforementioned determinations based on sensor data generated by one or more sensors.

For example, when the device is a light, the monitoring system control unit may receive (e.g., detect) sensor data from one or more light sensors. The sensor data may include, for example, data indicative of an attribute of the property that this sensed by a sensor, broadcasted by the sensor, and received (e.g., detected) by the monitoring system control unit. The sensor data may also include a sensor identifier that is associated with the sensor that outputted the sensor data. The monitoring system control unit may determine, based on the detected sensor data that the current operating state of a light is powered on. Alternatively, or in addition, separate and apart from sensor data, the monitoring system control unit may receive a message from a user device that indicates the current operating state of a device. For example, the user may leave the property to go for a jog, and from the street, determine (e.g., see) that a light was left on. The user can use a user device to generate and transmit a message to the monitoring system control unit that notifies the monitoring system control unit that a particular light in a particular room of the property was left on.

The process may continue at stage 620 with the monitoring system control unit determining the state of the monitoring system. For example, the monitoring system control unit may evaluate detected sensor data that is broadcast by one or more sensors installed at the property to determine whether one or more objects are moving at the property, to determine whether less than a threshold number of objects are moving at the property, to determine whether more than a threshold number of objects are moving at the property, to determine whether any objects have moved within a threshold period of time, to determine whether the temperature at the property has exceeded a predetermined temperature range, to determine the arming state of the monitoring system, to determine the arming state of one or more particular sensors, to determine the number of alarm events that the monitoring system is detecting, to determine the amount of time the monitoring system has been responding to an alarm event, to determine the time of day, or the like.

The process may continue at stage 630 with the monitoring system control unit determining, based on the current operating state of the device and the state of the monitoring system, that the current operating state of the device should be manipulated. For example, the monitoring system control unit may determine, whether a light that is powered on should be powered off based on the state of the monitoring system control unit.

This may include, for example, the monitoring control unit can determine that the manual control for a light should be manipulated because the light was left on in a first room of the property and there has not been any movement detected in the property for more than a threshold period of time. Alternatively, the monitoring control unit can determine that the manual control for a light should be manipulated because the light was left on and there has not been any movement in a particular room, where the light was left on, for more than a threshold period of time (though there may be movement in other areas of the property). In either instance, the monitoring system control unit's determination that there is a lack of movement in either (i) the property as a whole, or (ii) a room that includes a light that is on, may result in a determination that the manual control for a light that is left on should be manipulated in order to make the operating state of the light powered off.

By way of another examples, the monitoring system control unit can determine that he manual control for a light should be manipulated in response to first determining that there has not been any movement in the property for more than a threshold period of time and then determining whether one or more lights are left on in the property.

In each of the aforementioned examples, the monitoring system can determine to manipulate a manual control (e.g., a light switch) associated with a device (e.g., light bulb) based on an indication that the device is in a particular operating state (e.g., light is powered on in the property) and the state of the monitoring system (e.g., there is no moving objects in the property). Alternatively, or in addition, the monitoring system control unit can also determine that a manual control associated with the device should be manipulated in response to a request received from a user device to manipulate the manual control associated with the device.

The process may continue at stage 640 with the monitoring system control unit transmitting data to a drone that includes instructions to (i) navigate to a manual control associated with the device, and (ii) manipulate the manual control associated with the device. After the transmitted data, the drone may access the manual control map stored in the drone's memory obtain location information associated with the manual control identified by the transmitted data. Alternatively, the drone may receive the location information that was obtained by the monitoring system control unit and provided to the drone as part of the transmitted data. The drone may use the manual control map to navigate to the manual control location identified by the location information. Once the drone arrives, the drone may identify the manual control, and then manipulate the manual control. The drone may determine the correct control manipulation type by accessing the data associated with the particular identified control in the manual control map stored in the drone's memory.

Figure 7:
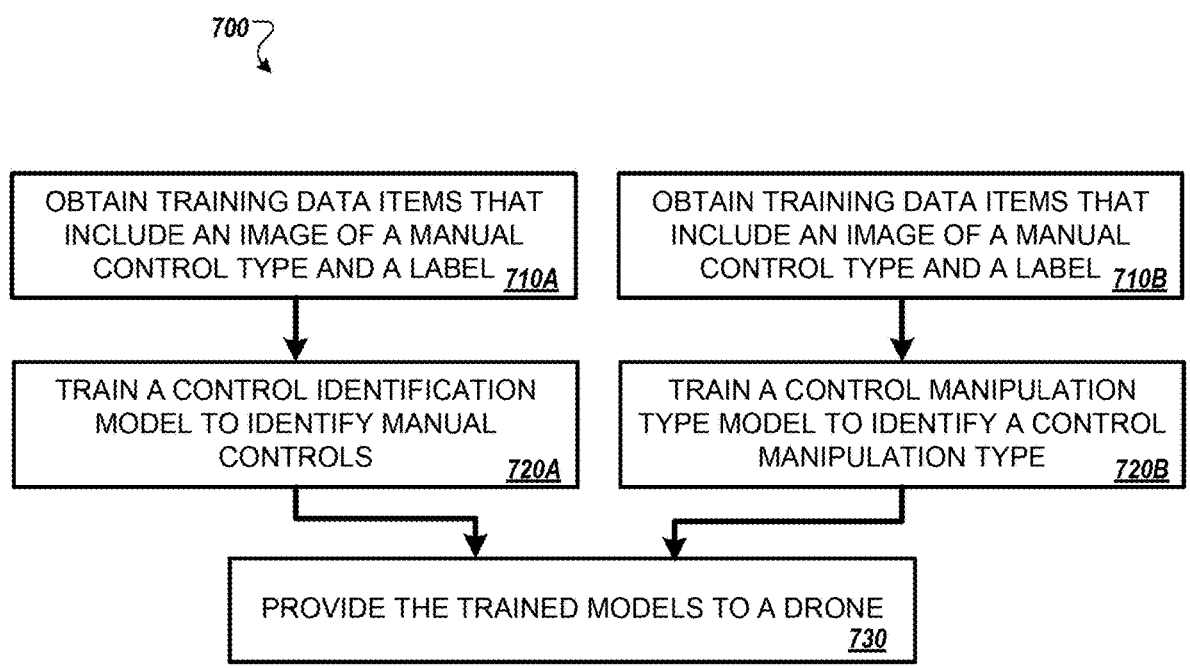
FIG. 7 is a flowchart of an example of a process for training multiple machine learning models.

FIG. 7 is a flowchart of an example of a process 700 for training multiple machine learning models. Generally, the process 700 includes a first branch that obtains training data items that each include an image of a manual control type and a label (710A), and training a control identification model to identify manual controls (720A). The process 700 includes a second branch that obtains training data items that each include an image of a manual control type and a label 710B (710B), and training a control manipulation type model to identify a control manipulation type (720A). At stage 730, the trained models may be provided to a drone.

In more detail, the first branch of process 700 begins at stage 710A. At stage 710A, a monitoring application server, or other computer, may obtain a first set of training data items that each include an image of a manual control and a label. In the first set of training data, the labels correspond to whether or not the object depicted in the image is a manual control or not a manual control. For example, if the image includes a light switch, a garage door opener, a stove burner knob, draw chain, a door lock, a thermostat graphical user interface, or the like, the image will be labeled as a manual control. Alternatively, if the image merely includes an image of a picture hanging on a wall and does not include a light switch, a garage door opener, stove burner knob, a draw chain, a door lock, a thermostat user interface, or the like, then the image is labeled as not a manual control.

A monitoring application server, or other computer, may use the first set of training data items to train a control identification model. The control identification model may include a neural network, a deep neural network, or the like. Training the neural network may include, for example, generating a vector for each training data item, and using the neural network to process the training vector. The neural network may be trained until the neural network begins to correctly classify a received training vector as being representative of an image that belongs into a class of images that (i) includes a manual control, or (ii) does not include a manual control. The neural network may begin to correctly classify received images when the value output by the neural network begins to indicate that the class (e.g., includes a manual control or does not include a manual control) predicted by the neural network for a received training vector matches the training label data associated with the training image to which the training vector corresponds.

In more detail, the second branch of process 700 begins at stage 710B. At stage 710B, a monitoring application server, or other computer, may obtain a second set of training data items that each include an image of a manual control and a label. In the second set of training data, the labels correspond to the manipulation type associated with the manual control in the image. For example, if the training image displays a typical light switch, the assigned label may be a manipulation type of "flick switch." By way of another example, if the training image includes an oven burner dial, the assigned label may be a manipulation type of "rotate dial." In a similar manner, if the training image shows a dead bolt door lock, the label may be a manipulation type of "rotate dead bolt knob." Furthermore, for example, if the training image shows a graphical user interface of a thermostat, the assigned label may be a manipulation type of "tap interface." Numerous other examples fall within the scope of the present disclosure. For instance, if the training image is a lamp draw chain, then the assigned label may be a manipulation type of "pull."

A monitoring application server, or other computer, may use the second set of training data items to train a control manipulation type model. The control manipulation type model may include a neural network, a deep neural network, or the like. Training the neural network may include, for example, generating a vector for each training data item, and using the neural network to process the training vector. The neural network may be trained until the neural network begins to correctly classify a received training vector as being representative of an image that includes a manual control with a particular control manipulation type. The neural network may begin to correctly classify received images when the value output by the neural network begins to indicate that the class (e.g., flick switch, rotate dial, rotate dead bolt, tap interface, or the like) predicted by the neural network for a received training vector matches the training label data associated with the training image to which the training vector corresponds.

At stage 730, each of the trained models may be provided to a drone 730. Providing the trained model to a drone at stage 730 may include, for example, transmitting the trained models to the drone via one or more networks such as a LAN, a WAN, a cellular network, the Internet, or a combination thereof. The trained models may be provided as part of a download request from a drone, a monitoring system control unit, or the like. The trained models may be provided as a new model to a drone that was not previously trained. Alternatively, or in addition, the trained models may be provided as an update to models previously provided to the drone.

In some implementations, the monitoring application server, or other computer, may transmit data to the drone that includes instructions to, upon receipt of the machine learning models, (i) identify manual controls in the property, and (ii) determine the corresponding control manipulation type for each respective manual control that is identified. Alternatively, in other implementations, the drone that received the provided models may wait for a later instruction to (i) identify manual controls in the property, and (ii) determine the corresponding control manipulation type for each respective control until a later point in time. For example, a user of a user device or a monitoring system control unit may also transmit the instruction to (i) identify manual controls in the property, and (ii) determine the corresponding control manipulation type as opposed to the monitoring application server, or other computer, that provided the trained models.

Figure 8:
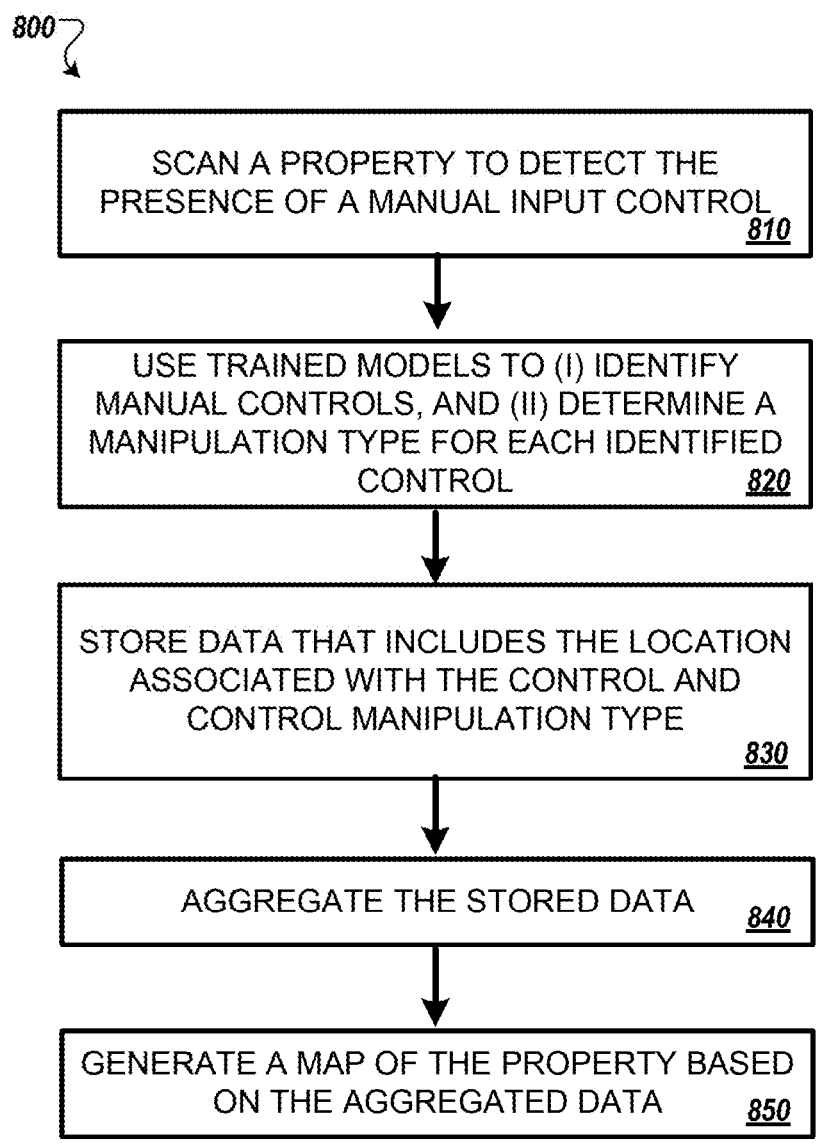
FIG. 8 is a flowchart of an example of a process for using one or more trained machine learning models installed on a drone to generate a map of manual controls located throughout a property.

FIG. 8 is a flowchart of an example of a process 800 for using one or more trained machine learning models installed in the storage device of a drone to generate a map of manual controls located throughout a property. Generally, the process 800 may include scanning a property to detect the presence of a manual input control (810), using one or more trained machine learning models installed on the drone to (i) identify manual controls, and (ii) determine a manipulation type for each identified control (820), store manual control data that includes the location associated with the manual control and the control manipulation type associated with the manual control (830), aggregating the stored manual control data (840), and generating a map of the property based on the aggregated manual control data (850).

The process 800 may begin at stage 810 with a drone scanning a property to detect the presence of one or more manual input controls. In some implementations, the drone may incrementally scan the property one room at a time, one wall at a time, or the like. Scanning the property may include, for example, the drone using a camera to capture video images, still images, or the like of each portion of a property.

After the drone obtains an image file at the scanning stage 810, the drone may use one or more trained models stored in the drone's onboard storage device at stage 820 to (i) identify manual controls, and (ii) determine a control manipulation type for each identified control. This may include, for example, providing an obtained image file, as an input, to a trained control identification model. In response, the control identification model may provide, as an output, an indication as to whether the input image file includes a manual control. For example, the trained identification model may provide a value that indicates the likelihood that the image includes a manual control. If it is determined that it is likely that the obtained image includes a manual control, then the obtained image may be provided, as an input, to a trained control manipulation type model. The trained control manipulation type model may provide, as an output, an indication as to the manipulation type that is required to alter the manual control. For example, the trained identification model may provide a value that indicates the likelihood that the manual control depicted in the image is associated with a particular control manipulation type.

In addition, the drone may also obtain the location associated with the image. For instance, the drone may use one or more lasers to measure the distance of the drone from the walls, ceiling, and floor respectively. Alternatively, or in addition, the drone may access one or more camera feeds to gauge the depth of the drone from the camera. Alternatively, or in addition, the drone may obtain one or more sensor identifiers from one or more sensors in the room, and use the sensor identifier to look up the location of the room in a sensor registry maintained by the monitoring system control unit, the monitoring application server, or the like. Alternatively, or in addition, the drone may also determine the particular entity that is associated with the manual control such as a particular light, thermostat, garage door, stove, or the like.

At stage 830, the drone may store data that includes the location associated with a manual control, the manipulation type associated with the manual control, the entity associated with the manual control, or a combination thereof. Such data may be acquired, and stored, for each manual control identified by the drone throughout a property. Then, the stored data may be aggregated at stage 840 and analyzed. At stage 850, the drone may generate a manual control map of the property based on the aggregated data. For instance, the drone may access a virtual map of the property stored in the drone memory and project the aggregated data onto the virtual map. The projecting of the aggregated data onto the virtual map provides a data point that servers as a marker in each room of the property where a manual control exists. In some implementations, metadata may be associated with marker of a manual control in the virtual map. The metadata may include, for example, the location of the control type in terms of measurements gathered by the drone at the time of detection of the manual control, the manipulation type of the control, and the entity with which the manual control is associated with (e.g., a first light switch in Room A is associated with the light in Room A, and a second light switch in Room A is associated with a light outside the house, or the like). The drone may use the markers on the virtual map to navigate to a particular manual control in response to an instruction from the monitoring system control unit, the monitoring application server, a user device, or the like.

The drone may use the generated manual control map to navigate a property. However, user of the generated manual control map may not be so limited. For instance, the map also may be transmitted to, and made accessible by, other network components. For instance, the monitoring application server, monitoring system control unit, or other network computers may access a generated manual control map, or at least the manual control data (e.g., the location of a manual control, the control manipulation type, and the entity associated with the control) on which the manual control map is based, to facilitate one or more of the processes described herein.

Figure 9:
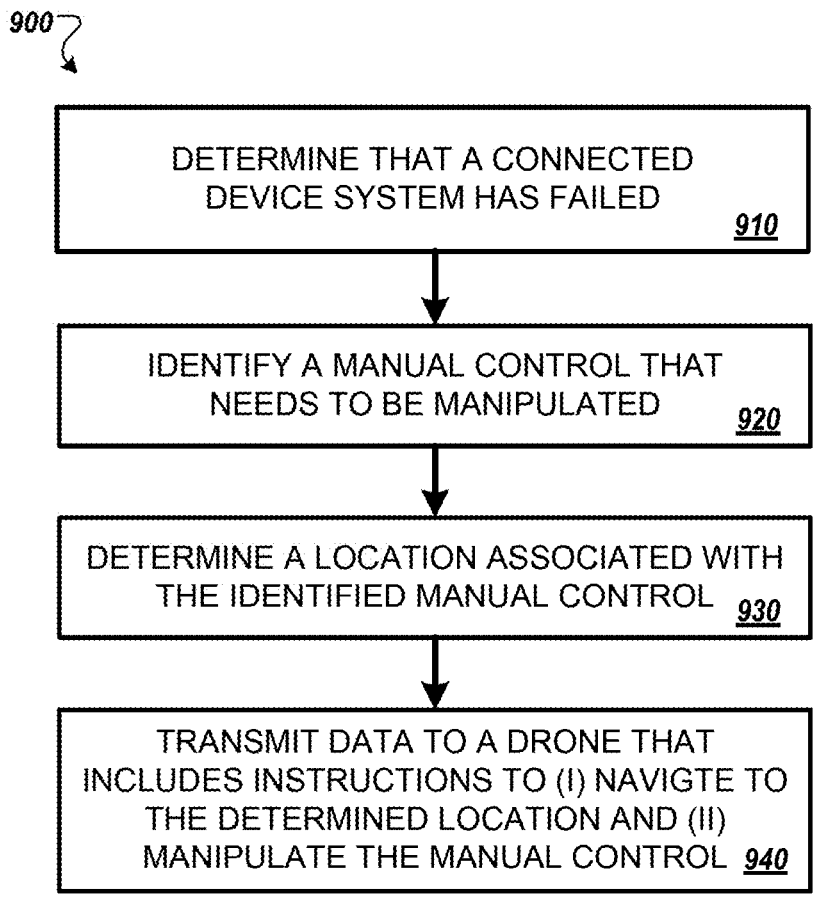
FIG. 9 is a flowchart of an example of a process for responding to the failure of a connected device by using a drone to manipulate manual controls associated with the connected device.

FIG. 9 is a flowchart of an example of a process 900 for responding to the failure of a connected device by using a drone to manipulate manual controls associated with the connected device. Generally, the process 900 may include determining that a connected device system has failed (910), identifying a manual control that needs to be manipulated (920), determining a location associated with the identified manual control (930), and transmitting data to a drone that includes instructions to (i) navigate to the determined location and (ii) manipulate the manual control (940).

Aspects of the present disclosure provide the advantages of automating control of one or more property features without the installation of connected property equipment. For instance, a user can instruct a security system from a remote location to turn off a light without installing connected lightbulbs. Alternatively, or in addition, the security system can determine that a light is on, no legitimate occupant of the property is present, and instruct a drone to turn off the light without installing connected lightbulbs. Accordingly, the subject matter of the present disclosure achieves connected property benefits with the use of a single drone without installing multiple connected lightbulbs throughout the person's property.

Another advantage of the present disclosure is that the subject matter of the present disclosure can provide connected property benefits without using RF transmissions to toggle the operating status of one or more devices. For instance, some connected property features such as a wirelessly connected lightbulb may require transmission of instructions using RF communications signals. However, in some properties such as military bases or government buildings, the use of RF communication signals may be prohibited. In such instances, a drone may be dispatched to physically manipulate manual controls without using RF communications to send instructions to a connected device. Note that, generally, drones utilized by the present disclosure may use RF signals to communicate. However, in certain embodiments, it may be arranged to physically connect one or more drones in a staging area, provide deployment instructions to the drone via the physical connection, sever the physical connection to the drone, and then deploy the drone to navigate through the property without further communications to or from the drone. In such instances, the drone could provide connected property functionality even in an RF signal free environment.

Though the present disclosure may provide some of the benefits of a connected property without installing connected property equipment, the present disclosure still has applications within a connected property environment. For example, the subject matter of the present disclosure may be used to facilitate property automation in the event that a connected device, connected system, or the like has failed.

Process 900 may be performed by a monitoring system control unit, or other computer, to facilitate property automation in the event that a connected device, connected system, or the like has failed. The process 900 may begin at stage 910 with determining that a connected device has failed. It may be determined that a connected device has failed by, for example, a monitoring system control unit determining that the connected device is unresponsive to instructions, that the monitoring system control unit cannot communicate with the connected device, a user device cannot communicate with the connected device, or the like.

In some implementations, the monitoring system control unit may maintain a connected device status table. The monitoring system control unit may be configured to periodically ping the each connected device installed as part of a connected system to determine whether each connected device is functioning properly. A ping may include a communication transmitted by the monitoring system control unit to the connected device to determine if there is a network communication between the monitoring system control unit and the connected device. If a network connection is established, the connected device should provide a reply to the ping.

The monitoring system control unit may store data in the device status table that indicates which connected devices are currently active, and functioning properly. A connected device may be configured to be currently active, and functioning properly if, for example, the connected device was pinged by monitoring system control unit, and provided a reply at least once within a predetermined period of time. Similarly, the monitoring system control unit may store data in the device status table that indicates which connected devices are not currently active, and functioning properly. A connected device may be determined to be not currently active, not functioning properly, or the like if the connected device has not provided a reply to a ping sent by the monitoring system control unit within a predetermined period of time.

The process may continue at stage 920 with the monitoring system control unit identifying a manual control that needs to be manipulated. In some instances, the monitoring system control unit knows that a particular entity—e.g., a connected light bulb—has failed. This may be because the connected light bulb has not responded to a ping request sent by the monitoring system control unit for more than a threshold period of time. The monitoring system control unit may access data collected by a drone device to determine at stage 930 information associated with the failed entity such as, the location of the failed entity, the control type of the failed entity, and the control manipulation type associated with the failed entity. The monitoring system control unit may then, at stage 940, transmit data to a drone that includes instructions to (i) navigate to the determined location, and (ii) manipulate the manual control. The drone may access a manual control map generated for the property, navigate to the manual control for the failed connected device, and manipulate the manual control for the connected device.

Figure 10:
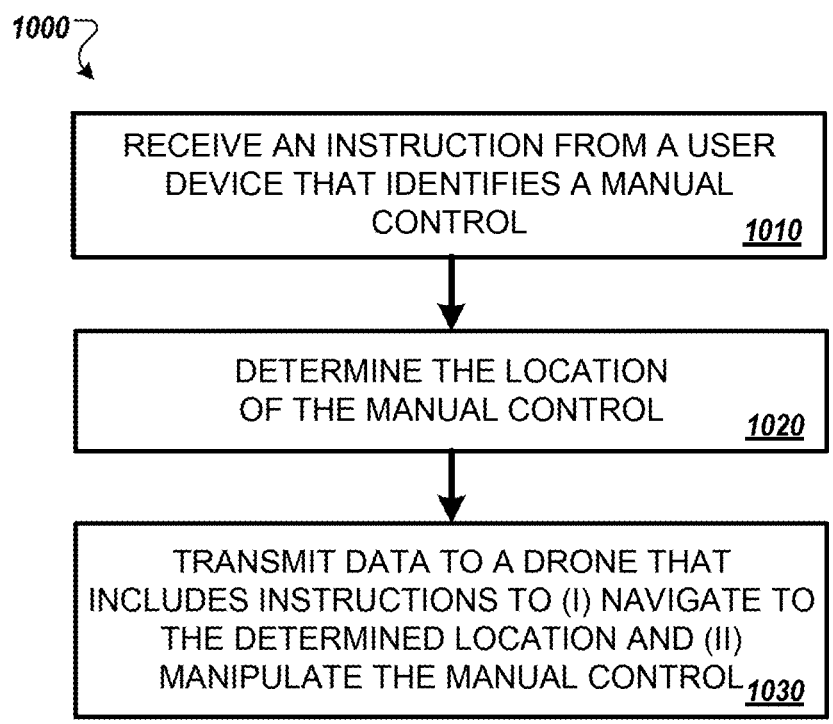
FIG. 10 is a flowchart of an example of a process of deploying a drone to manipulate a manual control in response to a request from a user device.

FIG. 10 is a flowchart of an example of a process 1000 of deploying a drone to manipulate a manual control in response to a request from a user device. Generally, the process 1000 may include receiving instruction from a user device that identifies a manual control 1010, determining the location of the manual control 1020, and transmitting data to a drone that includes instructions to (i) navigate to the determined location, and (ii) manipulate the manual control.

The process 1000 may be performed by a monitoring system control unit, or other computer. At stage 1010, the monitoring system control unit may receive a request from a user device that identifies a manual control. For instance, a user may have left the user's home, and as the user was driving away, the user noticed in his rear view mirror that the light in the bedroom was on. Once the user arrived at work, the user can access an application on his phone, and select a bedroom light icon. Alternatively, the user can simply select an instruction to turn off lights. In response to the user's instruction, the user's device may transmit a message to the monitoring system control unit using one or more networks such as a LAN, a WAN, a cellular network, the Internet, or the like. The message may include an identifier associated with the bedroom light, all lights in the property, or the like.

The monitoring system control unit may determine at stage 1020 the location of the manual control identified in the user's request. For instance, in response to a request to turn out the bedroom light, the monitoring system control unit may access a virtual map of the property and determine the location of the manual control associated with the bedroom light. In such an implementation, the monitoring system control unit may transmit data to a drone at stage 2013 that includes an instruction to (i) navigate to the determined location, and (ii) manipulate the manual control associated with the bedroom light to turn the bedroom light off. The drone may access a manual control map generated for the property, navigate to the manual control for the bedroom light, and manipulate the manual control for the bedroom light.

Alternatively, the monitoring system control unit may receive 1010 a message from a user device requesting that all lights be turned off. In such instances, the monitoring system control unit may analyze sensor data to determine 1020 the location of one or more lights in the property that are on. For instance, the monitoring system control unit may determine that a light in the bedroom is on and a light in the living room is on. The monitoring system control unit may access a virtual map to determine the locations of the manual controls in the bedroom and living room respectively, and then transmit data to a drone 1030 that includes instructions to (i) navigate to the manual controls for the lights in the bedroom and living room, and manipulate the manual controls for the lights in the bedroom and livening room respectively in order to turn off the lights. The drones may access a manual control map of the property to determine the most efficient access path to travel to each respective room, and the most efficient order that the rooms should be visited. Then, the drone may navigate to the manual control for each respective light using the manual control map, and turn off each respective light.

Figure 11:
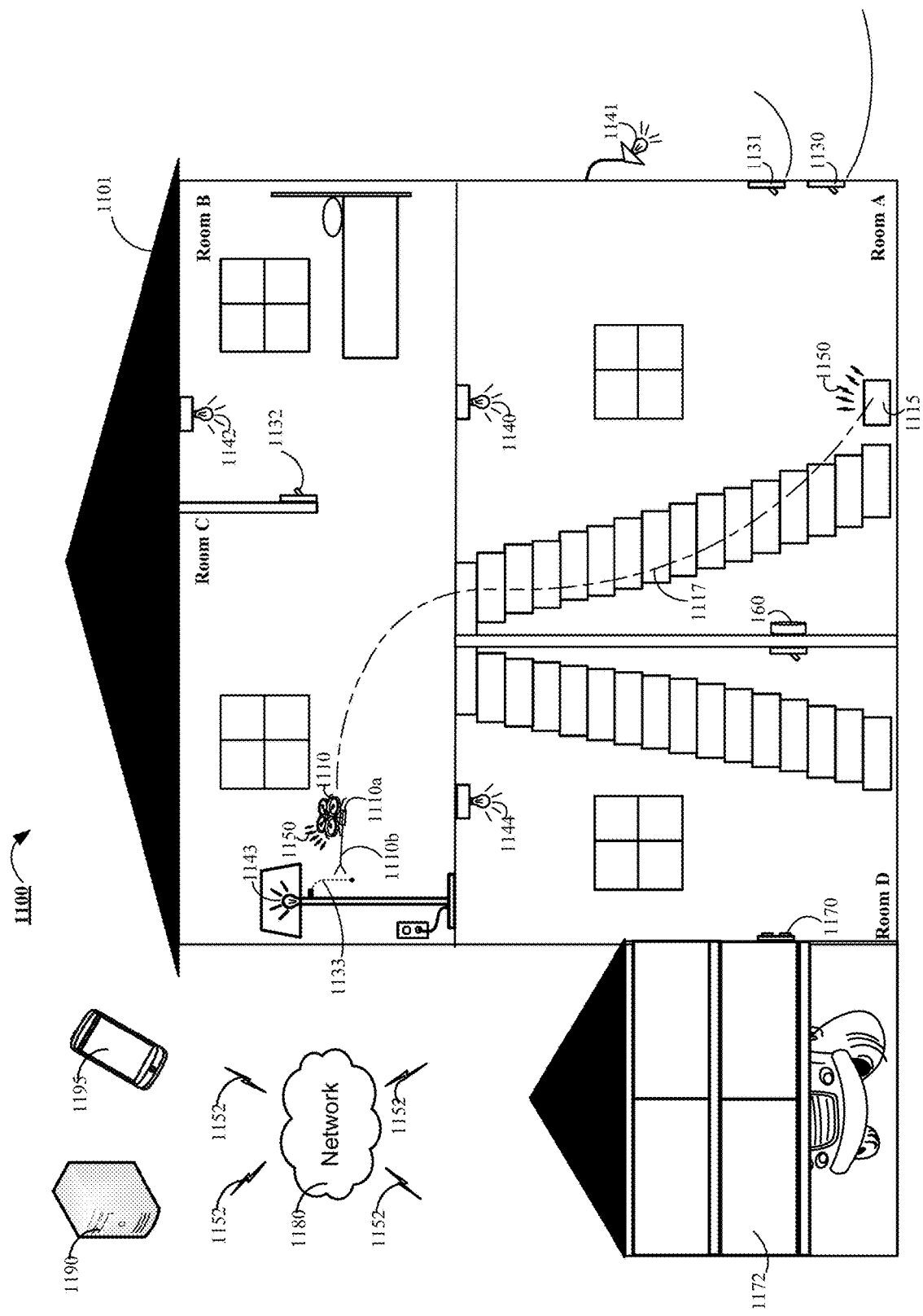
FIG. 11 is a contextual diagram of an example of a system that uses one or more drones to manipulate manual controls without a local monitoring system.

FIG. 11 is a contextual diagram of an example of a system 1100 that uses one or more drones to manipulate manual controls without a local monitoring system.

The system 1100 includes at least one wireless charging station 1115 and at least one drone 1110. In some implementations, the system 1100 may also include a monitoring application server 1190, a user device 1195, or both. The user device 1195 may be used to communicate with the drone 1110 using the network 1180, the network 1150, the communications links 1152, or a combination thereof. The network 1180 may include one or more of a LAN, a WAN, a cellular network, the Internet, or a combination thereof. Though the network 1180 facilitates a user device 1195 to communicate with the drone 1110 when the user device 1195 is remote from the property 1101, the present disclosure need not be so limited. For example, the user device 1195 may be capable of communicating with the drone 1110 via the network 1150 when the user device is located inside, or near, the property 1101. The network 1150 may include a local network such as a LAN.

A user of user device 1195 may use an application running on user device 1195 to communicate with the drone 1110. Once authenticated (e.g., using a login and passcode, biometric data, answers to security questions, or the like), the user of user device 1195 may use the drone 1110 to navigate throughout the property 1101 and provide a live video feed of the property 1101 back to the user device 1195 (or other display device accessible to the user) using a drone-mounted camera. The user of the user device 1195 can then examine the live video feed and determine whether one or more manual controls need to be manipulated within the property 1101. For example, the user can determine whether a light 1143 was left on, whether the stove was left on, whether the garage door 1172 was left open, or the like. In response to determining that a manual control needs to be manipulated, the user of the user device 1195 may submit one or more commands to instruct the drone 1110 to manipulate the manual control, as necessary.

By way of example, the user of the user device 1195 may instruct the user device 1195 to transmit a request to access the drone 1110. The request for access to the drone 1110 may be transmitted directly to the drone 1110 using one or more networks such as network 1180, network 1150, one or more communications links 1152, or a combination thereof. Alternatively, communications between the user device 1195 and the drone 1110 may be routed through the monitoring application server 1190.

Once authenticated, the user may be granted access to the drone 1110. For example, the user may remotely pilot the drone 1110, view a live video feed provided from a drone-mounted camera, access other data from other drone 1110 sensors (e.g., readings of a drone-mounted audio sensor data, a drone-mounted temperature sensor data, a drone-mounted light sensor data, or the like), or a combination thereof. In one implementation, for example, the user may pilot the drone 1110 along a navigation path such as navigation path 1117 while evaluating a live video feed from the drone 1110 on the user's user device 1195. While evaluating the live video feed, data from the drone's 1110 light sensor, or a combination thereof, the user may determine that the light 1143 was left on. In response, the user may submit one or more commands via an application running on the user device 1195 that instructs the drone 1110 to use a mechanical arm deployment unit 1110a to deploy a mechanical 1110b that can be used to engage the chain 1133 and manipulate the chain 1133 in order to turn off the light 1143.

In some implementations, the user of the user device 1195 may manually pilot the drone 1110 throughout the property 1101, as the drone nears the chain 1133, and even throughout the chain manipulation process. Alternatively, the user of the user device 1195 may merely monitor a live video feed from the drone 1110 as the drone 1110 autonomously navigates along a predetermined navigation path throughout the property, and then the user may provide instructions (e.g., turn off light 1143, turn down temperature using thermostat 160, close garage door 1172, or the like) to the drone in response to output readings from one or more drone 1110 sensors. Alternatively, in some implementations, the piloting of the drone 1110 may be a hybrid of manual and autonomous flight. For example, the user of the user device 1143 may manually pilot the drone 1110 throughout the property 1101 until a manual control is identified that needs to be manipulated. Then, once the drone 1110 arrives within a predetermined distance of the manual control (which the drone may identify using one or more machine learning models described herein), a prompt may be provided to the user of the user device 1195 that asks the user whether the user wants the drone 1110 to manipulate the manual control. If the user provides input that indicates the user wants the drone 1110 to manipulate the manual control, the drone may begin autonomous flight in order to navigate closer to the manual control, manipulate the manual control, or the like. Alternatively, the user may submit an instruction in response to the prompt that instructs the drone to not manipulate the identified manual control.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A monitoring system, comprising:
   a plurality of sensors installed at a property;
   a robotic device;
   a first device that is located at the property and that has an operating state controlled by manipulation of a manual control; and
   a monitoring unit, wherein the monitoring unit includes:
      a network interface;
      one or more processors; and
      one or more storage devices that include instructions that are operable, when executed by the one or more processors, to cause the one or more processors to perform operations comprising:
         obtaining sensor data collected by the plurality of sensors, wherein the sensor data indicates whether the first device is using electricity or gas;
         determining an operating state of the first device based on the sensor data;
         determining a state of the monitoring system;
         determining, based on (i) the operating state of the first device and (ii) the state of the monitoring system, whether to alter the operating state of the first device by manipulating the manual control; and
         in response to determining, based on the operating state of the first device and the state of the monitoring system, to alter the operating state of the first device by manipulating the manual control, transmitting one or more instructions to the robotic device that instruct the robotic device to (i) navigate to the first device and (ii) manipulate the manual control.

2. The monitoring system of claim 1, wherein determining the state of the monitoring system comprises:
   determining a number of moving objects at the property; and
   determining whether the number of moving objects at the property satisfies a predetermined threshold.

3. The monitoring system of claim 2, the operations further comprising:
   determining whether to alter the operating state of the first device based on the determination that the number of moving objects at the property satisfies a predetermined threshold; and
   in response to determining that the operating state of the first device should be altered based on the determination that the number of moving objects at the property satisfies a predetermined threshold, transmitting one or more instructions to the robotic device that instruct the robotic device to (i) navigate to the first device and (ii) manipulate the manual control.

4. The monitoring system of claim 1, wherein determining the state of the monitoring system includes determining that movement has not been detected at the property for more than a threshold period of time.

5. The monitoring system of claim 4, the operations further comprising:
   determining whether to alter the operating state of the first device based on the determination that movement of one or more objects has not been detected at the property for more than a threshold period of time; and
   in response to determining that the operating state of the first device should be altered based on the determination that movement of one or more objects has not been detected at the property for more than a threshold period of time, transmitting one or more instructions to the robotic device that instruct the robotic device to (i) navigate to the first device and (ii) manipulate the manual control.

6. The monitoring system of claim 1, wherein the sensor data indicates whether the first device is opened or closed.

7. The monitoring system of claim 1, wherein the sensor data indicates whether light is detected in a portion of the property.

8. The monitoring system of claim 7,
wherein the first device includes a lighting unit and the manual control includes a light switch, and
wherein the operating state includes the lighting unit being powered on and an altered operating state includes the lighting unit being powered off.

9. The monitoring system of claim 7,
wherein the first device includes a garage door and the manual control includes a garage door opener, and
wherein the operating state includes the garage door being opened and an altered operating state includes the garage door being closed.

10. The monitoring system of claim 1, wherein determining the state of the monitoring system includes determining that a temperature a portion of the property has exceeded a predetermined temperature range.

11. The monitoring system of claim 1, wherein the sensor data indicates a first temperature setting of a thermostat.

12. The monitoring system of claim 11,
wherein the first device includes a thermostat,
wherein the manual control includes one or more of a rotatable dial, one or more physical buttons, one or more graphical buttons on a graphical user interface, or a combination thereof; and
wherein the operating state includes the thermostat being set to the first temperature setting and an altered operating state includes the thermostat being set to a second temperature setting that is different than the first temperature setting.

13. The monitoring system of claim 1,
wherein the first device includes an oven,
wherein the manual control includes a dial that controls a supply of gas or electricity to one or more portions of the oven, and
wherein the operating state includes a heating element that is on and generating heat and an altered operating state includes a heating element that is off and no longer generating heat.

14. The monitoring system of claim 1, the operations further comprising;
obtaining a location of the first device; and
wherein transmitting the instruction to the robotic device includes transmitting the location of the first device to the robotic device.

15. The monitoring system of claim 1, wherein the robotic device includes a flying quadcopter drone.

16. The monitoring system of claim 1, wherein the monitoring unit includes a server that resides in a location that is remote from the property.

17. A method comprising:
obtaining sensor data collected by a plurality of sensors installed at a property, wherein the sensor data indicates whether a first device is using electricity or gas;
determining an operating state of the first device based on the sensor data;
determining a state of a monitoring system;
determining, based on (i) the operating state of the first device and (ii) the state of the monitoring system, whether to alter the operating state of the first device by manipulating a manual control associated with the first device; and
in response to determining, based on the operating state of the first device and the state of the monitoring system, to alter the operating state of the first device by manipulating the manual control, transmitting one or more instructions to a robotic device that instruct the robotic device to (i) navigate to the first device and (ii) manipulate the manual control.

18. A non-transitory computer-readable storage device having stored thereon instructions, which, when executed by a data processing apparatus, cause the data processing apparatus to perform operations comprising:
obtaining sensor data collected by a plurality of sensors installed at a property, wherein the sensor data indicates whether a first device is using electricity or gas;
determining an operating state of the first device based on the sensor data;
determining a state of a monitoring system;
determining, based on (i) the operating state of the first device and (ii) the state of the monitoring system, whether to alter the operating state of the first device by manipulating a manual control associated with the first device; and
in response to determining, based on the operating state of the first device and the state of the monitoring system, to alter the operating state of the first device by manipulating the manual control, transmitting one or more instructions to a robotic device that instruct the robotic device to (i) navigate to the first device and (ii) manipulate the manual control.

\* \* \* \* \*